(12) United States Patent
Kobayashi

(10) Patent No.: US 11,391,953 B2
(45) Date of Patent: Jul. 19, 2022

(54) DISPLAY DEVICE, CONTROL METHOD FOR DISPLAY DEVICE, AND PROGRAM

(71) Applicant: SEIKO EPSON CORPORATION, Tokyo (JP)

(72) Inventor: Shinichi Kobayashi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/162,128

(22) Filed: Jan. 29, 2021

(65) Prior Publication Data

US 2021/0239988 A1 Aug. 5, 2021

(30) Foreign Application Priority Data

Jan. 30, 2020 (JP) .............................. JP2020-013124

(51) Int. Cl.
| | | |
|---|---|---|
| *G02B 27/01* | (2006.01) | |
| *G02B 27/00* | (2006.01) | |
| *G06F 3/01* | (2006.01) | |
| *G06V 20/10* | (2022.01) | |
| *G06V 20/20* | (2022.01) | |
| *G06F 3/0481* | (2022.01) | |
| *G06F 3/0484* | (2022.01) | |
| *G06F 3/04855* | (2022.01) | |
| *G06F 3/0488* | (2022.01) | |

(52) U.S. Cl.
CPC ..... *G02B 27/0172* (2013.01); *G02B 27/0093* (2013.01); *G06F 3/012* (2013.01); *G06F 3/017* (2013.01); *G06V 20/10* (2022.01)

(58) Field of Classification Search
USPC ............................................................. 345/8
See application file for complete search history.

(56) References Cited

U.S. PATENT DOCUMENTS

| | | | |
|---|---|---|---|
| 2009/0147993 A1* | 6/2009 | Hoffmann .......... | G02B 27/0093 382/103 |
| 2011/0298829 A1* | 12/2011 | Stafford .............. | G06V 40/165 345/659 |
| 2013/0241948 A1* | 9/2013 | Kimura .................... | G09G 5/02 345/589 |
| 2015/0049002 A1* | 2/2015 | Ishikawa ............ | G02B 27/0179 345/8 |

(Continued)

FOREIGN PATENT DOCUMENTS

| | | |
|---|---|---|
| JP | 2018-101019 A | 6/2018 |
| JP | 2019-036914 A | 3/2019 |

*Primary Examiner* — Chineyere D Wills-Burns
(74) *Attorney, Agent, or Firm* — Oliff PLC

(57) ABSTRACT

A specific posture is set as a standard posture of the head of a user wearing a display device, and a movement from the standard posture is detected. The detected movement of the head is associated in advance with a first mode and a second mode that are display modes of the image display unit, and the image display unit performs display in the first mode when the detected movement of the head is a movement in a predetermined first direction and exceeds a predetermined first threshold value and performs display in the second mode when the movement is a movement in a second direction that is different from the first direction and exceeds a predetermined second threshold value. An input is received in an input mode associated in advance with the first mode or the second mode.

12 Claims, 15 Drawing Sheets

(56) References Cited

U.S. PATENT DOCUMENTS

| | | | |
|---|---|---|---|
| 2016/0018887 A1* | 1/2016 | Tsukahara | G06F 3/012 |
| | | | 345/8 |
| 2016/0034039 A1* | 2/2016 | Maeda | G06F 3/04842 |
| | | | 715/810 |
| 2016/0103326 A1* | 4/2016 | Kimura | G06T 19/006 |
| | | | 345/690 |
| 2016/0282619 A1* | 9/2016 | Oto | G02B 27/017 |
| 2018/0157044 A1* | 6/2018 | Choi | H04R 1/08 |
| 2018/0176547 A1* | 6/2018 | Kobayashi | H04N 13/366 |
| 2019/0056813 A1 | 2/2019 | Fukuda et al. | |
| 2021/0165484 A1* | 6/2021 | Suguhara | G09G 5/36 |

* cited by examiner

DISPLAY DEVICE, CONTROL METHOD FOR DISPLAY DEVICE, AND PROGRAM

The present application is based on, and claims priority from JP Application Serial Number 2020-013124, filed Jan. 30, 2020, the disclosure of which is hereby incorporated by reference herein in its entirety.

BACKGROUND

1. Technical Field

The present disclosure relates to a display device and a control method for the display device.

2. Related Art

A head-mounted display device that is worn on the head of a user, transmits an outside scene such that it is able to be visually recognized, and also allows various displays to be superimposed on the outside scene has been proposed. Such a display device can be set, for example, to display an instruction manual for a work target while allowing the user to view the work target as necessary or to display a part of a display image of an information processing device such as a computer. JP-A-2018-101019 has been disclosed as an example of the former, JP-A-2019-036914 has been disclosed as an example of the latter, and the like. With such a display device, coordination between the information processing device and the display device, improvement in work efficiency, and the like can be achieved.

However, with respect to such a display device, while it is possible to display a variety of information in various modes, a relationship between input operations and display modes, such as performing a scroll operation for displayed information, or applying various settings has not been sufficiently taken into account. For example, in JP-A-2019-036914, while a part of a display screen on the information processing device side is displayed on a head-mounted display device, operations such as an operation of switching display, an operation of selecting an option, and the like must be made on the information processing device side, and the information to be displayed has nothing to do with the input mode, which makes the systems difficult to use.

SUMMARY

The present disclosure can be implemented as a head-mounted display device configured to cause outside scenes to be visually recognized. A display device includes an image display unit configured to display an image, an input unit coupled to the display unit and configured to accept input in at least a plurality of input modes, a setting unit configured to set, as a standard posture, a specific posture of the head of a user wearing the display device, a detection unit configured to detect a movement of the head of the user wearing the display device from the standard posture, a display control unit configured to associate a movement of the head with a first mode and a second mode that is different from the first mode, that are display modes of the image display unit, and cause the image display unit to perform display in the first mode when the detected movement of the head is a movement in a predetermined first direction and exceeds a predetermined first threshold value and perform display in the second mode when the movement is a movement in a second direction that is different from the first direction and exceeds a predetermined second threshold, and an input control unit configured to cause the input unit to accept the input in an input mode associated in advance with the first mode or the second mode of the image display unit among the plurality of input modes when the image display unit performs display in the first mode or the second mode.

DESCRIPTION OF EXEMPLARY EMBODIMENTS

A. First Embodiment

Figure 1:
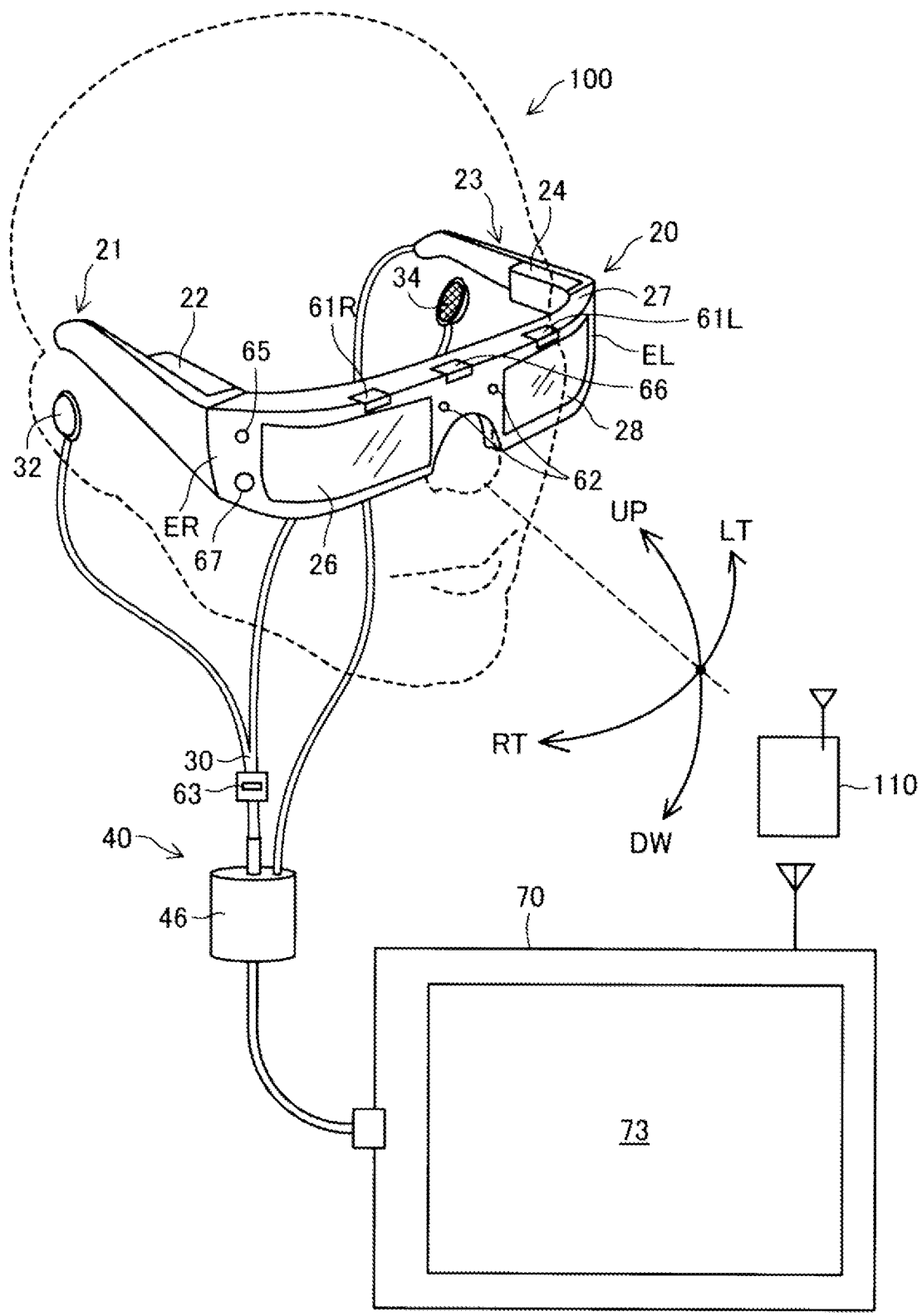
FIG. 1 is an explanatory view illustrating an external configuration of an HMD according to an embodiment.

A-1. Overall Configuration of HMD:

FIG. 1 is a diagram illustrating an appearance configuration of a head-mounted display (HMD) 100 as a display device according to an embodiment of the present disclosure. The HMD 100 is a display device including an image display unit 20 configured to enable a user wearing it around his or her head to visually recognize virtual images and a control device 70 configured to control the image display unit 20. The control device 70 is a device configured to perform processing necessary to exchange signals with the image display unit 20 to cause the image display unit 20 to display images, and includes a display 73 having a touch panel function. The HMD 100 has two display units, and thus when there is a need to distinguish the two units from each other, the image display unit 20 may be referred to as a first display unit and the display 73 as a second display unit.

The control device 70 serves as an input unit, an input control unit, a setting unit, and a display control unit as will be described below. In the HMD 100, the control device 70 receives a video (including audio) transmitted from a mobile terminal 110, such as a smartphone, and outputs the video to the image display unit 20 in wireless communication, to cause the image display unit 20 to display the image (including the moving image) and play back the audio.

The image display unit 20 is a wearable body to be worn around the head of a user and has an eyeglasses shape in this embodiment. The image display unit 20 includes a main body including a right holding part 21, a left holding part 23, and a front frame 27, and includes a right display unit 22, a left display unit 24, a right light-guiding plate 26, and a left light-guiding plate 28 in the main body.

The right holding part 21 and the left holding part 23 respectively extend rearward from both ends of the front frame 27 to hold the image display unit 20 on the head of the user, like the temples of eyeglasses. Here, one of the ends of the front frame 27 located on the right side of the user wearing the image display unit 20 is referred to as an end ER, and the other end located on the left side of the user is referred to as an end EL. The right holding part 21 is provided to extend from the end ER of the front frame 27 to a position corresponding to the right head of the user wearing the image display unit 20. The left holding part 23 is provided to extend from the end EL of the front frame 27 to a position corresponding to the left head of the user wearing the image display unit 20.

The right light-guiding plate 26 and the left light-guiding plate 28 are provided in the front frame 27. The right light-guiding plate 26 is positioned in front of the right eye of the user wearing the image display unit 20 to allow the right eye to visually recognize an image. The left light-guiding plate 28 is positioned in front of the left eye of the user wearing the image display unit 20 to allow the left eye to visually recognize an image.

The front frame 27 has a shape in which an end of the right light-guiding plate 26 is connected to an end of the left light-guiding plate 28. The position of the connection corresponds to a position between the eyebrows of the user wearing the image display unit 20. The front frame 27 may include a nose pad part that comes in contact with the nose of the user wearing the image display unit 20, the nose pad part being provided at the position of the connection of the right light-guiding plate 26 and the left light-guiding plate 28. In this case, the nose pad part, the right holding part 21, and the left holding part 23 allow the image display unit 20 to be held around the head of the user. In addition, a belt that brings the right holding part 21 and the left holding part 23 in contact with the back of the head of the user wearing the image display unit 20 may also be connected to the right holding part 21 and the left holding part 23. In this case, the belt enables the image display unit 20 to be firmly held around the head of the user.

The right display unit 22 displays images on the right light-guiding plate 26. The right display unit 22 is provided on the right holding part 21 and is positioned adjacent to the right head of the user wearing the image display unit 20. The left display unit 24 displays images on the left light-guiding plate 28. The left display unit 24 is provided on the left holding part 23 and is positioned adjacent to the left head of the user wearing the image display unit 20.

The right light-guiding plate 26 and the left light-guiding plate 28 according to this embodiment are optical parts (e.g., prisms or hologram) formed of an optical transparent resin or the like, and guide imaging light output by the right display unit 22 and the left display unit 24 to the eyes of the user. Note that surfaces of the right light-guiding plate 26 and the left light-guiding plate 28 may be provided with light control plates. The light control plates are thin plate-like optical elements having varying transmittance depending on a wavelength region of light, and function as so-called wavelength filters. The light control plates are arranged to cover a surface of the front frame 27 (the surface opposite to the surface facing the eyes of the user), for example. Appropriate selection of optical properties of the light control plates allows the transmittance of light in any wavelength region, such as visible light, infrared light, and ultraviolet light to be adjusted, and allows an amount of outside light incident on the right light-guiding plate 26 and the left light-guiding plate 28 from outside and passing through the right light-guiding plate 26 and the left light-guiding plate 28 to be adjusted.

The image display unit 20 guides imaging light generated by the right display unit 22 and the left display unit 24 to the right light-guiding plate 26 and the left light-guiding plate 28, respectively, and to allow the user to visually recognize a virtual image with the imaging light (which will also be referred to as "displaying an image"). When the outside light traveling from in front of the user passes through the right light-guiding plate 26 and the left light-guiding plate 28 and is incident on the eyes of the user, the imaging light forming a virtual image and the outside light are incident on the eyes of the user. Thus, the visibility of virtual images viewed by the user can be affected by the intensity of the outside light.

Thus, the ease of visual recognition of virtual images can be adjusted, for example, by mounting the light control plates on the front frame 27 and appropriately selecting or adjusting the optical properties of the light control plates. In a typical example, light control plates having optical transparency to the extent that a user wearing the HMD 100 can visually recognize at least an outside scene may be selected. The use of the light control plates is expected to be effective for protecting the right light-guiding plate 26 and the left light-guiding plate 28 and preventing damage to the right light-guiding plate 26 and the left light-guiding plate 28, adhesion of dust, and the like. The light control plates may be detachable from the front frame 27 or each of the right light-guiding plate 26 and the left light-guiding plate 28. Alternatively, a plurality of different types of light control plates may be provided to be detachable for replacement, or the light control plates may be omitted.

In addition to the above-described members for image display, the image display unit 20 is provided with video cameras 61R and 61L, an inward-facing camera 62, an illuminance sensor 65, a six-axis sensor 66, and an indicator 67. The two video cameras 61R and 61L are arranged on the front frame 27 of the image display unit 20. The two video cameras 61R and 61L are provided at positions approximately corresponding to the eyes of a user, and are designed to be able to measure the distance to a target object in so-called binocular vision. The distance is measured by the control device 70. Note that the video cameras 61R and 61L may be provided at any position as long as a distance can be measured in a binocular vision, or may be disposed at the ends ER and EL of the front frame 27. Note that a distance to a target object can be measured using a configuration implemented by the analysis of a monocular camera and an image of the camera, a configuration implemented by a millimeter wave radar, or the like.

The video cameras 61R and 61L are digital cameras including an imaging element such as a CCD or a CMOS, an imaging lens, and the like. The video cameras 61R and 61L capture an image of at least part of an outside scene (real space) in a forward direction from the HMD 100, in other words, in a direction of the visual field of the user wearing the image display unit 20. The video cameras 61R and 61L capture an image in a range overlapping the visual field of the user or in the direction of the visual field of the user to perform imaging in a direction for visual recognition of the user. In this embodiment, a width of an angle of view of the video cameras 61R and 61L is set to allow the video cameras 61R and 61L to capture the entire visual field of the user in which the user can have visual recognition through the right light-guiding plate 26 and the left light-guiding plate 28. An optical system capable of appropriately setting the width of the angle of view of the video cameras 61R and 61L may be provided.

Similarly to the video cameras 61R and 61L, the inward-facing camera 62 is a digital camera equipped with an imaging element such as a CCD or a CMOS, an imaging lens, and the like. The inward-facing camera 62 captures an image in an inward direction of the HMD 100, in other words, in a direction facing the user wearing the image display unit 20. The inward-facing camera 62 of this embodiment includes an inward-facing camera for capturing an image of the right eye of the user, and an inward-facing camera for capturing an image of the left eye of the user. In this embodiment, a width of the angle of view of the inward-facing camera 62 is set to a range in which an image of the entire right eye or the entire left eye of the user can be captured. The inward-facing camera 62 is used to detect a position of the eyeballs of the user, particularly a position of the pupils, and to calculate a direction of the line-of-sight of the user from a position of the pupils of the eyes. Of course, the inward-facing camera 62 may be provided with an optical system capable of appropriately setting a width of the angle of view, and may be used to read a facial expression of the user or the like by capturing not only an image of the pupils of the user but also a larger region.

The illuminance sensor 65 is provided at the end ER of the front frame 27 and is disposed to receive outside light from the front of the user wearing the image display unit 20. The illuminance sensor 65 outputs a detection value corresponding to an amount of received light (intensity of received light). The LED indicator 67 is disposed at the end ER of the front frame 27. The LED indicator 67 is turned on during image capturing by the video cameras 61R and 61L to notify that the imaging is in progress.

The six-axis sensor 66 is an acceleration sensor and detects an amount of movement of the head of the user in X, Y, and Z directions (3 axes) and the inclination of the head of the user in the X, Y, and Z directions (3 axes). With respect to the X, Y, and Z directions, the Z direction is a direction along the gravitational direction, the X direction is a direction from the rear to the front of the user, and the Y direction is a direction from the left to the right of the user. In addition, an inclination of the head is an angle around each axis (X-axis, Y-axis, and Z-axis) of the X, Y, and Z directions. An amount of movement and an angle of the head of the user from an initial position can be ascertained by combining signals from the six-axis sensor 66.

The image display unit 20 is coupled to the control device 70 via a coupling cable 40. The coupling cable 40 is pulled from the tip of the left holding part 23 and is detachably coupled to a connector 77 provided on the control device 70 via a relay connector 46. The coupling cable 40 includes a headset 30. The headset 30 includes a microphone 63, and a right ear bud 32 and a left ear bud 34 attached to the left and right ears of the user. The headset 30 is coupled to the relay connector 46 and is integrated into the coupling cable 40.

Figure 2:
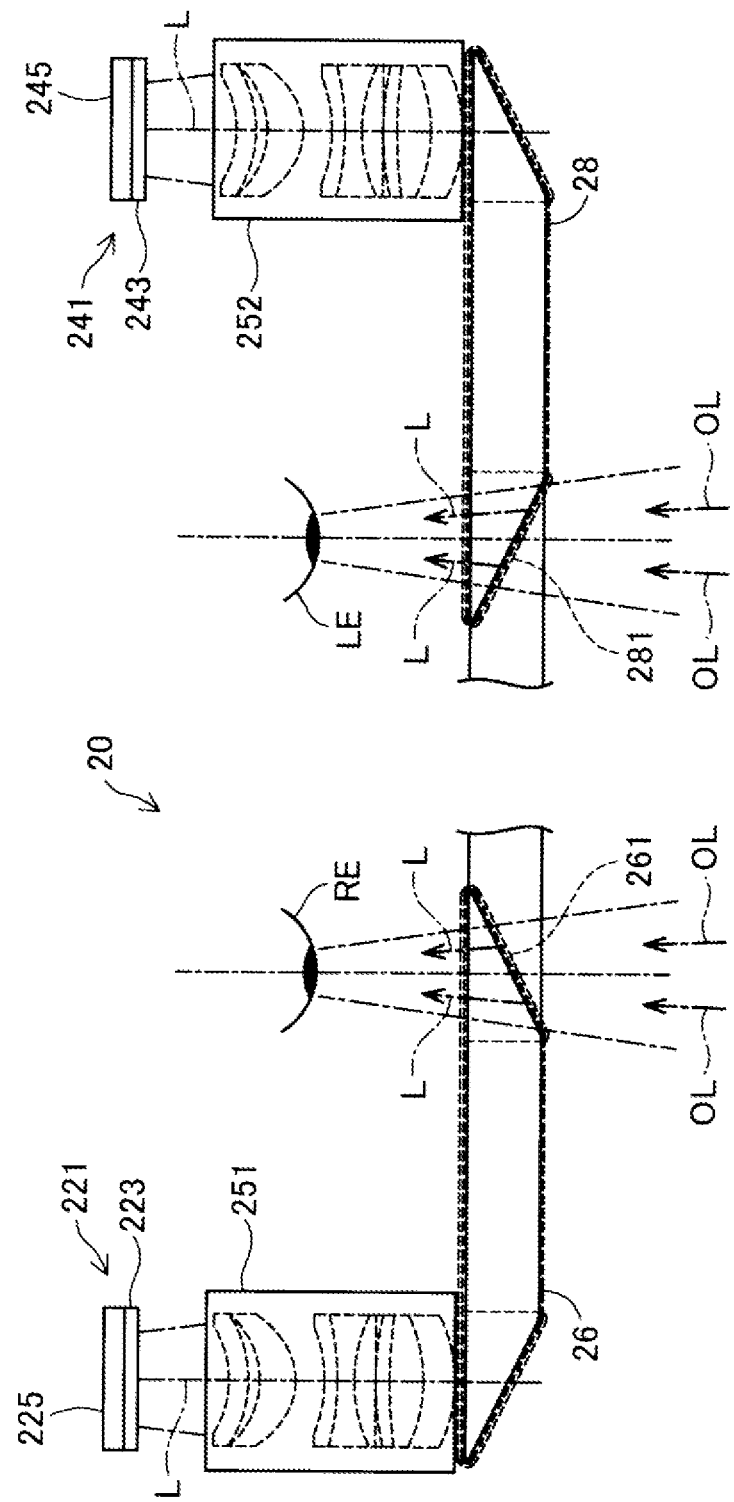
FIG. 2 is a plan view illustrating a configuration of a main part of an optical system included in an image display unit.

When a signal from the control device 70 for displaying an image is output to the image display unit 20 via the coupling cable 40, the image display unit 20 forms an image using the right display unit 22 and the left display unit 24. An optical configuration for helping the user recognize an image will be described. FIG. 2 is a plan view illustrating a main part of a configuration of an optical system included in the image display unit 20. For convenience of description, FIG. 2 illustrates the right eye RE and left eye LE of a user. As illustrated in FIG. 2, the right display unit 22 and the left display unit 24 are configured to be symmetric on the right- and left-hand sides.

As a configuration to allow the right eye RE to visually recognize a virtual image, the right display unit 22 serving as a right image display unit includes an organic light emitting diode (OLED) unit 221 and a right optical system 251. The OLED unit 221 emits imaging light. The right optical system 251 includes a lens group and the like and guides, to the right light-guiding plate 26, imaging light L emitted by the OLED unit 221.

The OLED unit 221 includes an OLED panel 223 (which will be abbreviated simply as an OLED) and an OLED driving circuit (which will be abbreviated simply as an R-CPLD) 225 configured to drive the OLED 223. The OLED 223 is a self-luminous display panel including light-emitting elements configured to emit red (R), green (G), and blue (B) color light, respectively, using organic electro-luminescence. The OLED 223 includes a plurality of pixels arranged in a matrix form, and each pixel including one R, G, and B elements as one unit.

The R-CPLD 225 selects and powers the light-emitting elements included in the OLED 223 according to a signal transmitted from the control device 70 to cause the light-emitting elements to emit light. The R-CPLD 225 is fixed onto a rear surface of the OLED 223, i.e., the back side of a light-emitting surface by bonding or the like. The R-CPLD 225 may include, for example, a semiconductor device configured to drive the OLED 223, and may be mounted onto a substrate fixed to the rear surface of the OLED 223. Note that the OLED 223 may adopt a configuration in which light-emitting elements that emit white light are disposed in a matrix form and are disposed over color filters corresponding to the colors R, G, and B, respectively. In addition, an OLED 223 with a WRGB configuration including light-emitting elements configured to radiate white (W) light in addition to light-emitting elements configured to radiate R, G, and B light, respectively, may be adopted.

The right optical system 251 includes a collimating lens configured to collimate the imaging light L emitted from the OLED 223 into a luminous flux in a parallel state. The imaging light L collimated by the collimate lens into a luminous flux in a parallel state is incident on the right light-guiding plate 26. On an optical path configured to guide light inside the right light-guiding plate 26, a plurality of reflective surfaces configured to reflect the imaging light L are formed. The imaging light L is reflected multiple times inside the right light-guiding plate 26 and then, is guided to the right eye RE side. A half mirror 261 (reflective surface) positioned in front of the right eye RE is formed in the right light-guiding plate 26. The imaging light L reflected by the half mirror 261 is emitted from the right light-guiding plate 26 to the right eye RE to form an image on the retina of the right eye RE to allow the user to visually recognize a virtual image.

As a configuration to allow the left eye LE to visually recognize a virtual image, the left display unit 24 serving as a left image display unit includes an OLED unit 241 and a left optical system 252. The OLED unit 241 emits imaging light. The left optical system 252 includes a lens group and the like and guides, to the left light-guiding plate 28, imaging light L emitted by the OLED unit 241. The OLED unit 241 includes an OLED 243, and an L-CPLD 245 configured to drive the OLED 243. Details of each of the units are the same as those of the OLED unit 221, the OLED 223, and the R-CPLD 225. Details of the left optical system 252 are the same as those of the right optical system 251.

According to the configuration described above, the HMD 100 can function as a see-through display device. That is, the imaging light L reflected by the half mirror 261 and outside light OL passing through the right light-guiding plate 26 are incident on the right eye RE of the user. The imaging light L reflected by a half mirror 281 and outside light OL passing through the left light-guiding plate 28 are incident on the left eye LE of the user. In this manner, the HMD 100 allows the imaging light L of the image processed inside and the outside light OL to be incident on the eyes of the user in an overlapped manner. As a result, the user can view an outside scene (real world) through the right light-guiding plate 26 and the left light-guiding plate 28 and also visually recognize a virtual image formed by the imaging light L overlapping the outside scene. In other words, the image display unit 20 of HMD 100 allows the outside scene to pass through the image display unit and causes the user to visually recognize the outside scene in addition to the virtual image.

The half mirrors 261 and 281 reflect imaging light output by the right display unit 22 and the left display unit 24, respectively, and extract an image. In addition, the right optical system 251 and the right light-guiding plate 26 are also collectively referred to as a "right light-guiding unit", and the left optical system 252 and the left light-guiding plate 28 are also collectively referred to as a "left light-guiding unit". Configurations of the right light-guiding unit and the left light-guiding unit are not limited to the example described above, and any configuration can be used as long as a virtual image can be formed in front of the eyes of the user using imaging light. For example, diffraction gratings or translucent reflective films may be used for the right light-guiding unit and the left light-guiding unit.

Figure 3:
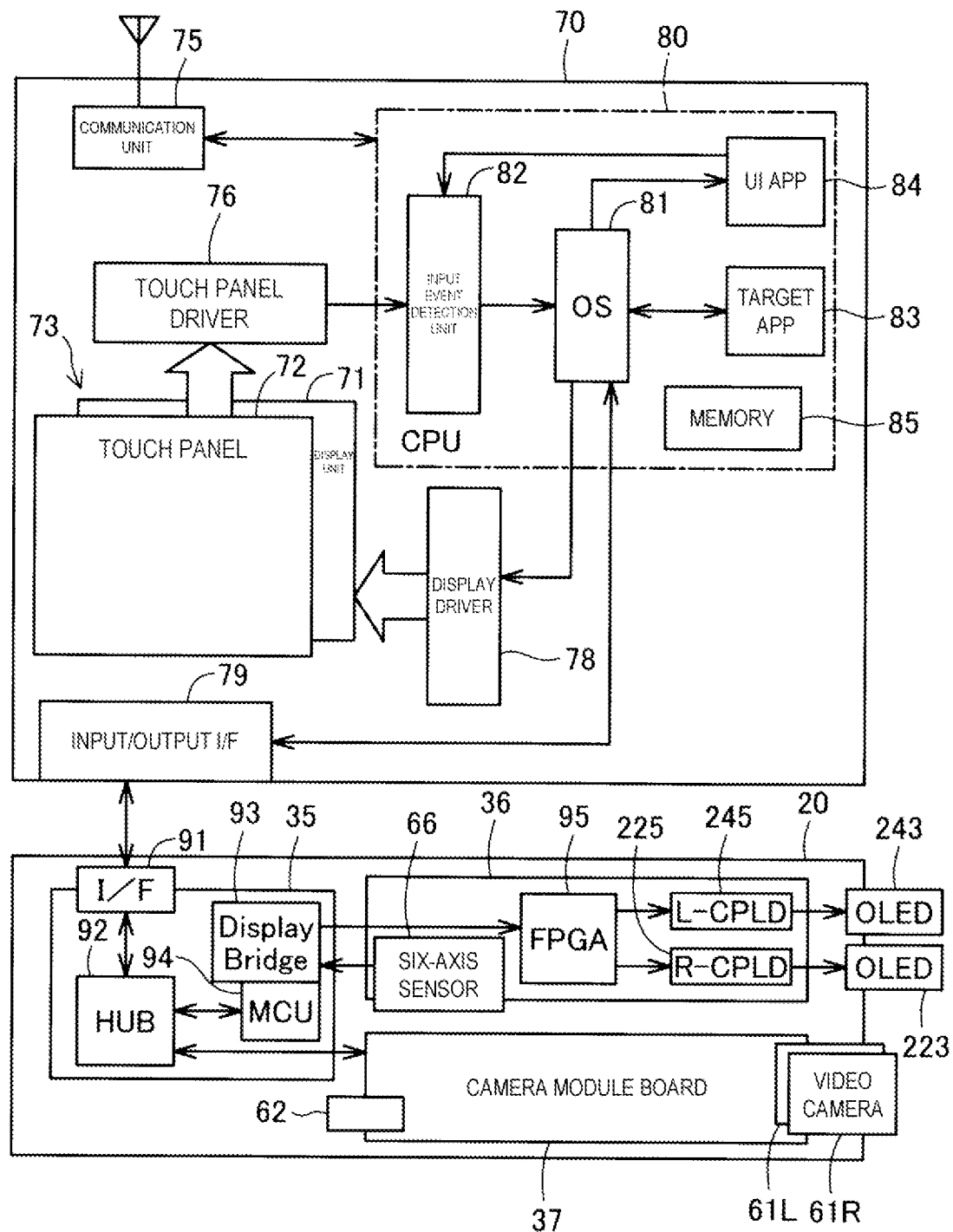
FIG. 3 is a schematic configuration diagram illustrating a configuration of a signal processing circuit of the display device.

A-2. Configuration of Control Device 70:

Next, a configuration of the control device 70 that outputs various signals to the image display unit 20 will be described. FIG. 3 is a block diagram illustrating an internal configuration of the control device 70 and the image display unit 20. The control device 70 includes, in addition to the display 73 described above, a communication unit 75, a CPU 80, a touch panel driver 76, a display driver 78, an input/output interface (which will be abbreviated simply as an input/output I/F below) 79, and the like. Note that driving power of the control device 70 is supplied to each of the units from a battery which is not illustrated in the drawing.

The display 73 includes a display unit 71 that displays an image in full color and a touch panel 72 that detects the position and strength of the touch on the display unit 71 when a user touches the display unit 71 with his or her fingertip or the like. The display unit 71 is driven by the display driver 78 that receives a signal from the CPU 80. In addition, the touch panel 72 is coupled to the touch panel driver 76, receives a driving signal from the touch panel driver 76 to dynamically detect a touch position on the display 73, and outputs the detected touch position and the strength to the CPU 80 via the touch panel driver 76.

The communication unit 75 communicates with a mobile terminal 110 and receives a video signal including images and sound. Any communication method such as Wi-Fi (registered trademark), BlueTooth (registered trademark), or the like may be adopted. In addition, the video signal may be received from the mobile terminal 110 via a wire. The input/output I/F 79 may have a connector form conforming to the so-called Type-C standard and is capable of inputting and outputting data in serial communication.

The CPU 80 that controls each of the units includes a memory 85 and realizes functions of an operating system (which will be abbreviated simply as an OS) 81, an input event detection unit 82, and the like by executing programs stored in the memory 85. The OS 81 used in this embodiment has the same basic function as that of a general-purpose OS used in the mobile terminal 110 and the like. Differences from the OS are the expanded functions of capturing images of outside scenes using the video cameras 61R and 61L, detecting a line-of-sight using the inward-facing camera 62, displaying images on the display 73 along with the image display unit 20, and the like. Thus, an application program created for the OS 81 can be executed by the control device 70 as is or with a slight modification. Conceivable examples of such an application program include games, application programs that support various kinds of work, and the like. Such an application program will be referred to as a target app 83. In addition, in this embodiment, separate from the target app 83, a user interface support application program (which will be simply referred to as a UI app below) 84 that provides various input methods can be executed concurrently with the target app 83.

The CPU 80 outputs the video received from the mobile terminal 110 via the communication unit 75 to the image display unit 20 via the input/output I/F 79 under control of the OS 81. In conjunction with such input and output of video signals, the CPU 80 handles the display 73 as an input unit, causes images such as buttons, keys, or fields necessary for input to be displayed on the display unit 71 via the display driver 78, and inputs the position and strength of a touch of the user on the touch panel 72 in accordance with the display via the touch panel driver 76. The position and strength of the touch detected by the touch panel driver 76 are input to the input event detection unit 82, collated with the status of the user interface for input received from the UI app 84, interpreted by the OS 81, and output to the target app 83. The form of the user interface for input and the technique of input by the OS 81 and the UI app 84 will be described in detail below.

The CPU 80 outputs the video input via the communication unit 75 to the image display unit 20 via the input/output I/F 79 under control of the OS 81. The image display unit 20 is constituted broadly by a basic board 35, an optical module board 36, and a camera module board 37 as illustrated at the lower part of FIG. 3. The basic board 35 is equipped with an interface unit (which will be simply referred to as an I/F unit) 91 that exchanges video signals with the input/output I/F 79 of the control device 70, a HUB 92 that separates signals and mediates the signals between the I/F unit 91 and other units, an MCU 94 that takes a part of the signals from the HUB 92 to operate, and a display bridge 93 that processes video signals with a help of processing by the MCU 94 and outputs the video signals to the optical module board 36.

Another signal line from the HUB 92 is coupled to the camera module board 37 and is used to output video signals from the video cameras 61R and 61L and the inward-facing camera 62 mounted on the camera module board 37 to the control device 70 via the HUB 92 and the I/F unit 91. The CPU 80 can analyze videos from the video cameras 61R and 61L, recognize a product, or the like present in the visual field of the user, and also can perform processing such as causing the image display unit 20 to display provided information of the product. In addition, the CPU 80 can also analyze the video from the inward-facing camera 62 to specify the direction of the line-of-sight of the user and perform processing such as specifying the target object that the user is viewing in the outside scene captured by the video cameras 61R and 61L.

The optical module board 36 is equipped with an FPGA 95, and the R-CPLD 225, the L-CPLD 245, and the six-axis sensor 66 that are described above. The FPGA 95 is coupled to the display bridge 93 of the basic board 35, separates video signals received from the display bridge 93 into video signals for the right and left eyes, and further converts the signals into RGB signals. The R-CPLD 225 and the L-CPLD 245 drive the OLEDs 223 and 243 in accordance with the signals from the FPGA 95. The six-axis sensor 66 is coupled to the display bridge 93 on the basic board 35 and outputs postures (on three axes) and accelerations of the image display device 20 in each axial direction (on three axes).

The three axes indicating postures are for postures in the Z-axis direction (top-bottom direction) that is the gravitational direction, the Y-axis direction (left-right direction) that is the direction that is orthogonal to the Z-axis direction and extends from the right eye to the left eye of the user wearing the image display unit 20 (FIG. 1), and the X-axis direction (front-rear direction) that is the direction orthogonal to the Z-axis and the Y-axis. By nature, the head of a human easily takes four postures due to the structure of the skeleton, the four postures including a right-side rotational posture in which the head rotates to the right eye side approximately about the Z-axis (the arrow RT side in FIG. 1), a left-side rotational posture in which the head likewise rotates to the left eye side (arrow LT side in FIG. 1), an upward rotational posture in which the head rotates upward (arrow UP side in FIG. 1), and a downward rotational posture in which the head rotates downward (arrow DW in FIG. 1), and thus the image display unit 20 may be configured such that signals from the six-axis sensor 66 are processed on the image display unit 20 side and are output as the four postures. An acceleration is an acceleration in each of the X-, Y-, and Z-axis directions.

Figure 4:
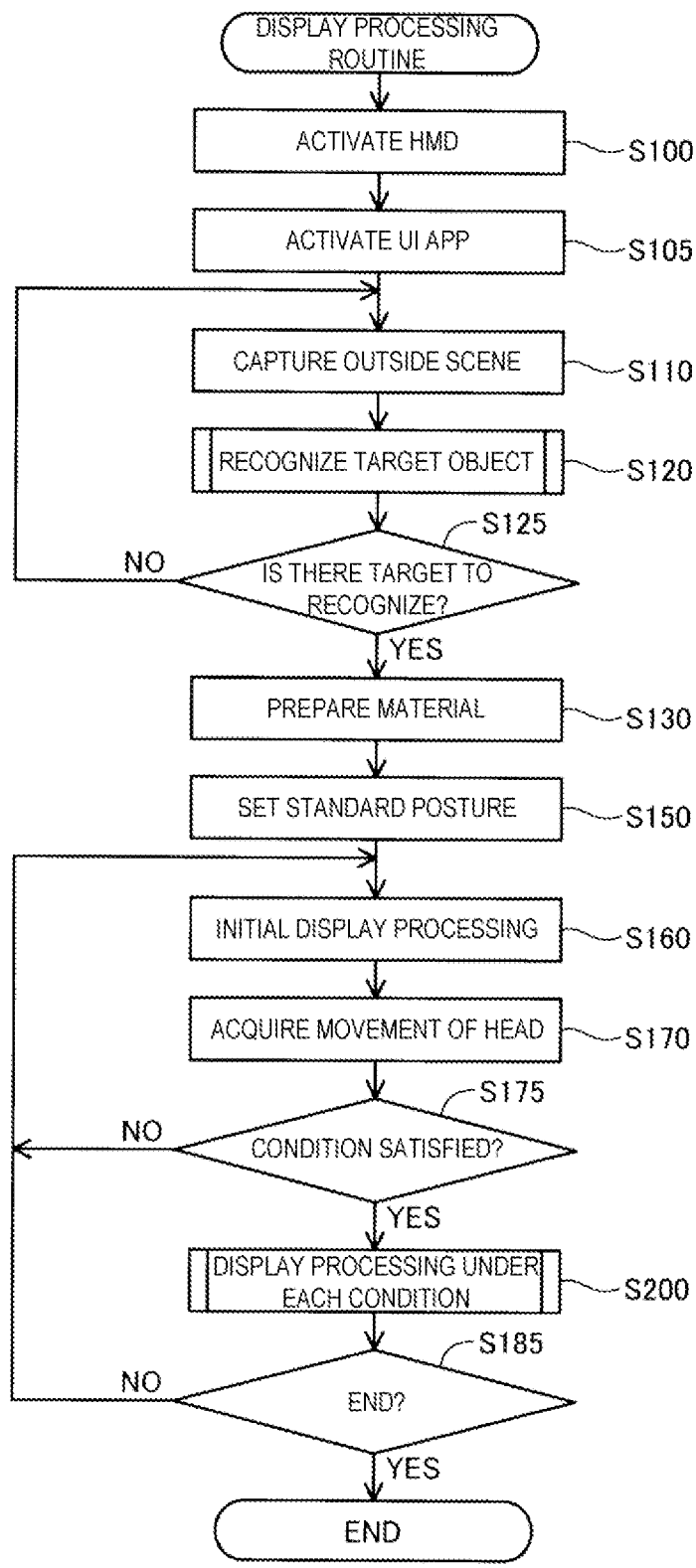
FIG. 4 is a flowchart showing a display processing routine executed by a control device in a first embodiment.

A-3. Aspect of Display and Input:

On the premise of the hardware described above, modes of display and input performed by the HMD 100 will be described. FIG. 4 is a flowchart showing a display processing routine executed by the control device 70. This processing begins by inputting power to the control device 70 and selecting a specific application program, that is, the set target app 83, to instruct the control device to activate the app.

When this processing routine is activated, the control device 70 sends power to the image display unit 20 via the coupling cable 40 to activate the entire HMD 100 (step S100). Thereafter, the control device 70 activates the UI app 84 before starting the target app 83 (step S105). The UI app 84 is an application program that supports input of data to various target apps 83 under instructions of the OS 81 as illustrated in FIG. 3. Because the target app 83 operates under control of the OS 81, if the UI app 84 is not activated, the UI app displays a button or a field for input on a screen that is controlled by itself, that is, a screen displayed on the image display unit 20, and performs an operation of the button, input of text data input to the field, and the like via an input mechanism provided by the OS 81. Examples of the input mechanism include a mechanism in which a virtual button displayed on the image display unit 20 is selected by detecting a line-of-sight using the inward-facing camera 62, detecting the line-of-sight being blocked by a movement of the eyelid movement, and pressing (determining) the selected button, and a mechanism in which a sound input by the microphone 63 is recognized and text data is input to the field selected by the line-of-sight.

These mechanisms are realized by invoking a function call provided by the OS 81 on standard from the application program side. The OS 81 is set to provide various function calls dedicated to the HMD 100 to allow the application program to display a specific button or field and accept an input from the user while the UI app 84 is not activated. On the other hand, when the UI app 84 is activated in step S105, the OS 81 operating on the control device 70 makes a change such that invoking of the function call provided on standard is passed to the UI app 84.

After completing the above preparation, processing by the target app 83 designated to be activated is started. Thus, the processing from step S110 which will be described below is performed by the target app 83. When the target app 83 starts processing, the video cameras 61R and 61L are used to capture an image of an outside scene (step S110). Next, processing to recognize a target object from the captured outside scene is performed (step S120). This is processing to determine whether a pre-registered target object is present in the captured outside scene. The target app 83 activated in this embodiment is configured to support work of users, and if a product to work on or the like is within the visual field, the target app 83 detects the product and performs support processing which will be described below.

Next, it is determined whether there is a pre-registered target to recognize in the captured outside scene (step S125), and if there is no target to recognize (step S125: "NO"), the processing returns to step S100 to repeat the processing described above. If there is a pre-registered target to recognize in the outside scene (step S125: "YES"), processing of preparing a material of the target to recognize is then performed (step S130). The material is a manual, a work instruction, or the like, of the product to work on.

Next, the control device 70 sets a standard posture (step S150). The standard posture is an initial posture made when the user works using the HMD 100. Normally, the posture made when detecting the target in step S120 is registered as a standard posture. The standard posture is set based on angles of the head of the user in the X, Y, and Z-axis directions acquired from the six-axis sensor 66. A movement of the head of the user, which will be described below, is detected as a movement from this standard posture.

Although the standard posture is assumed to be defined as a posture made when the target is detected in this embodiment, the standard posture can be variously defined in accordance with types of work, or the like. A posture of the user is not limited to a posture of the user facing the front, and in some cases, a posture of the user facing the right side, the left side, or upward or downward is conceivable as a standard posture. In addition, a sit-and-work state may be a standard posture, and a stand-and-work state may be a standard posture. Various methods can be used to set a standard posture. One of the methods may be configured such that a "standard posture setting button" is displayed on the display 73 of the control device 70 and the posture made when the user is pressing the button may be registered as a "standard posture". A standard posture may be registered using voice recognition or the like, instead of a button. Furthermore, several postures may be registered in advance as standard posture candidates, and one of them may be selected as a standard posture. Furthermore, standard postures may be defined according to a work stand or a desk on which a user works, a cart or a workpiece carried by a conveyor or a line, a tool or a jig operated by users, and the like.

Alternatively, a SLAM technology in which a map of an environment in which a user is using the HMD 100 and the location of the user in the environment map are estimated from a large number of images obtained by capturing the surroundings of the user by an external camera (not illustrated) moving the place around the user using the HMD 100 or by the video cameras 61R and 61L provided on the HMD 100 may be used to recognize the location and the posture of the user in the use environment and defined a standard posture based on the location and the posture. Among locations and postures of the user in the use environment recognized using the SLAM technology, the location and the posture in which the user remained and worked most frequently or for a long time may be set as a standard posture, or the location and posture taken at the start of work may be set as a standard posture. Alternatively, a standard posture may be defined based on a location and a posture taken at another predetermined time.

Although the standard posture is assumed to be defined as a posture made when the target is detected in this embodiment, the standard posture can be variously defined in accordance with types of work, or the like. One of the methods may be configured such that a "standard posture setting button" is displayed on the display 73 of the control device 70 and the posture made when the user is pressing the button may be registered as a "standard posture". A standard posture may be registered using voice recognition or the like, instead of a button. Furthermore, several postures may be registered in advance as standard posture candidates, and one of them may be selected as a standard posture. Furthermore, standard postures may be defined according to a work stand, a desk, or a carriage or a workpiece carried by a conveyor or a line on which users work, a tool or a jig operated by users, and the like.

Furthermore, a SLAM technology in which a map of the environment in which a user is using the HMD 100 and the location of the user in the environment map are estimated from a large number of images of peripheries of the user captured by an external camera (not illustrated) moving the place in which the user is using the HMD 100 or by the video cameras 61R and 61L provided on the HMD 100 may be used to recognize the location and the posture of the user in the use environment, and a standard posture may be defined based on the location and the posture. Among locations and postures of the user in the use environment recognized using the SLAM technology, the location and the posture in which the user stayed and made most frequently for a long time may be set as a standard posture, or the location and posture taken at the start of work may be set as a standard posture. Alternatively, a standard posture may be defined based on a location and a posture taken at another predetermined time.

Figure 5:
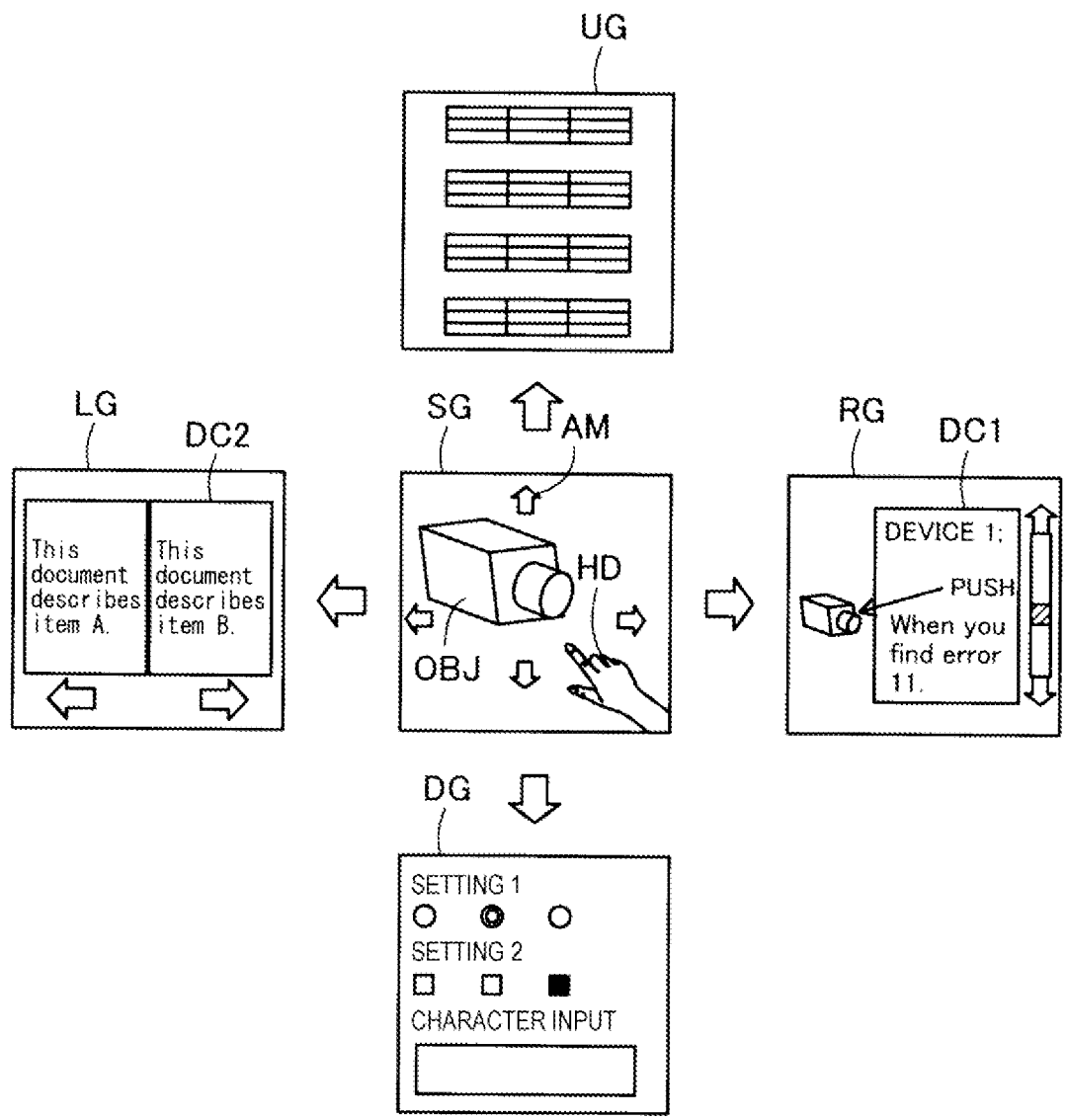
FIG. 5 is an explanatory diagram illustrating virtual display in the image display unit.

When the setting of the standard posture is completed, the initial display processing is then performed (step S160). The initial display processing is to perform preset initial display on the outside scene viewed by the user through the image display unit 20. FIG. 5 is an explanatory diagram illustrating various modes of display realized by the target app 83. The screen SG shown at the center of FIG. 5 shows a state in which a user attempting to work is viewing a target object OBJ on the desk. On the screen SG, a hand HD of the user is depicted as being in the visual field of the user. This state is the visual field of the user in a standard posture. At this moment, as initial display, arrows AM indicating the four upward, downward, left, and right directions are displayed on the screen SG. These arrows AM are images that the control device 70 causes the image display unit 20 to display. The arrows AM indicate that there is some information in the directions of the arrows. Because information is available in all of the four directions in this embodiment, the arrows AM are displayed in the upward, downward, left, and right directions, however, if there is no information in the left direction, arrows AM are displayed in only three directions including upward, downward, and right directions. The initial display may not be provided of course, and may be provided in a different display mode, such as part of the provided information is visible, instead of using arrows.

Next, the control device 70 performs processing of acquiring the movement of the head based on information from the six-axis sensor 66 provided in the image display unit 20 (step S170). Although the movement of the head can be in various forms, information created by combining information of the direction in which the head moves among the upward, downward, left, and right directions with the magnitude of the acceleration of the movement can be acquired. Here, as described using FIG. 1 before, the upward, downward, left, and right directions are the upward direction UP in which the user raises the face (head), the downward direction DW in which the user lowers the face, the left side LT to which the user turns his or her face in the left direction, and the right side RT to which the user turns his or her face in the right direction.

After acquiring the movement of the head, it is determined whether the movement satisfies a predetermined condition (step S175), and if the condition is satisfied, display processing corresponding to each condition is performed (step S200). Details of the display processing (step S200) will be described below. If the condition is not satisfied (step S175: "NO"), the processing returns to step S160 to repeat the above-described processing. On the other hand, when the condition is satisfied and the display processing (step S200) is performed, it is then determined if the work is to be ended (step S185), and when the control device 70 ends the target app 83 or the control device 70 is turned off, the processing proceeds to "END" to end the present processing routine. If it is determined that the processing is not to be ended, the processing returns to step S160 to repeat the above-described processing.

Figure 6:
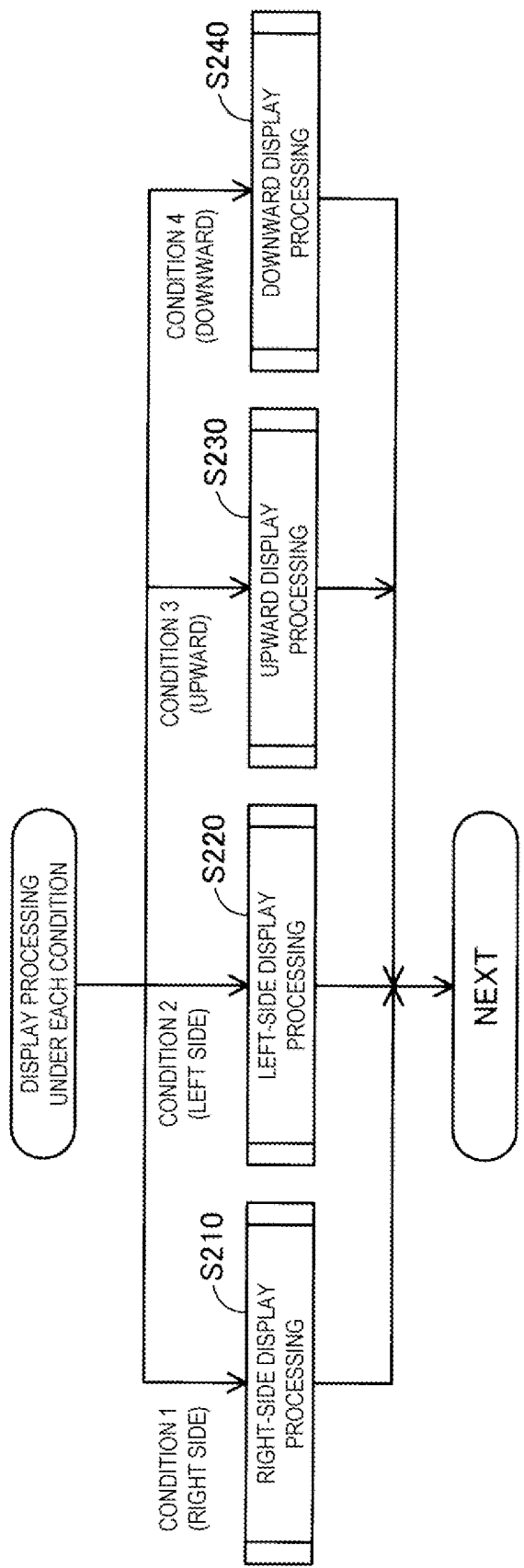
FIG. 6 is a flowchart showing a display process under each condition.

Next, the processing of step S200 in FIG. 4, that is, the display processing when each condition is satisfied, will be described using FIG. 6. When the movement of the head satisfies the predetermined condition in step S175, the control device 70 performs the next display processing under each condition. In the example illustrated in FIG. 6, there are four conditions for detecting a movement of the head.

1 Condition 1: When the Head Faces the Right Side

When the head faces the right side at a predetermined angle (here, 40 degrees) or more and the acceleration of the head in the right direction RT at that time is higher than or equal to a predetermined threshold value based on a signal from the six-axis sensor 66;

2 Condition 2: When the Head Faces the Left Side

When the head faces the left side at a predetermined angle (here, 40 degrees) or more and the acceleration of the head in the left direction LT at that time is higher than or equal to a predetermined threshold value based on a signal from the six-axis sensor 66;

3 Condition 3: When the Head Faces Upward

When the head faces upward at a predetermined angle (here, 15 degrees) or more and the acceleration of the head in the upward direction UP at that time is higher than or equal to a predetermined threshold value based on a signal from the six-axis sensor 66; and 4 Condition 4: When the Head Faces Downward When the head faces the downward at a predetermined angle (here, 15 degrees) or more and the acceleration of the head in the downward direction DW at that time is higher than or equal to a predetermined threshold value based on a signal from the six-axis sensor 66.

The conditions include the condition that the acceleration at the time of viewing in a corresponding direction is higher than or equal to a predetermined value, and thus if the acceleration is equal to or lower than a predetermined threshold value, that is, the user is slowly rotating his or her head in any of the upward, downward, left, and right directions even though the user is turning his or her head at a predetermined angle or more in the upward, downward, left, and right directions, the conditions [1] to [4] are not satisfied. In this case, the screen SG illustrated at the center of FIG. 5 is displayed as is. This case may occur when the user searches for the target object OBJ in the right-left direction, e.g., when attempting to take a tool on the desk. The condition that the acceleration of the head is higher than or equal to the predetermined threshold value is provided to detect a situation in which the user intentionally moves his or her head, rather than trying to simply look around from a standard posture. Note that threshold values for determining accelerations in the left, right, upward, or downward directions may be different from each other for each direction or may be the same in the plurality of conditions. Similarly, an angle for determining the head turning in the left, right, upward, or downward direction at a predetermined angle or more may also be determined for each direction.

These conditions are exclusive and are not satisfied at the same time because the directions of the head are different. Thus, when one of the conditions is satisfied, any display processing (steps S210 to S240) corresponding to the condition is executed. Each processing is as follows.

1 When Condition 1 is Satisfied:

In this case, the user of the HMD 100 sees the right side of the target object OBJ that has been viewed in the standard posture, and thus right-side display processing (step S210) is executed. As a result, the target object OBJ deviates from the center of the visual field, and information DC1, which is one piece of prepared content, is displayed on the image display unit 20 as illustrated in the screen RG of FIG. 5. Thus, the user can refer to the information DC1 displayed in the visual field. In this embodiment, when the user looks to the right side quickly in view from the standard posture, the information DC1 describing an operation method and a handling method for the target object OBJ is displayed. The information DC1 is scrollable as indicated by a scroll bar displayed as auxiliary display in the screen. An operation of the scroll bar requires some kind of input processing. In this embodiment, as illustrated in FIG. 3, this input processing is performed using the UI app 84 and the input event detection unit 82. This processing will be described below together.

2 When Condition 2 is Satisfied:

In this case, the user of the HMD 100 sees the left side of the target object OBJ that has been viewed in the standard posture, and thus left-side display processing (step S220) is executed. As a result, the target object OBJ deviates from the center of the visual field, and information DC2, which is one piece of prepared content, is displayed on the image display unit 20 as illustrated in the screen LG of FIG. 5. Thus, the user can refer to the information DC2 displayed in the visual field. In this embodiment, when the user looks at the left side quickly in view from the standard posture, various kinds of the information DC2 on the target object OBJ are displayed. The information DC2 can be referred to back and forth using page flipping buttons displayed as auxiliary display in the screen. An operation of the buttons requires some kind of input processing similar to the scroll bar. This processing will be described below together.

3 When Condition 3 is Satisfied:

In this case, the user of the HMD 100 sees upward of the target object OBJ that has been viewed in the standard posture, and thus upward display processing (step S230) is executed. As a result, the target object OBJ deviates from the center of the visual field, and the screen UG displaying prepared options is displayed on the image display unit 20. The screen UG includes display for assigning a relationship between the direction of the head and the screen as auxiliary display. Using this screen UG, the user can set the display on the HMD 100. The setting of the display refers to what information or screen display is assigned in which direction when viewed in the standard posture. Also in this case, some kind of input processing is required, similarly to Conditions 1 and 2.

4 When Condition 4 is Satisfied:

In this case, the user of the HMD 100 sees downward of the target object OBJ that has been viewed in the standard posture, and thus downward display processing (step S240) is executed. As a result, the target object OBJ deviates from the center of the visual field, and the screen DG performing setting and input provided in advance is displayed on the image display unit 20. The screen DG displays options to be selected, a field for text input, and the like as auxiliary display. The user can make a setting change, input text, or the like, with reference to the screen DG. Some input processing is required for setting changes and text input. This processing will also be described below.

One of the display in each display processing described above corresponds to display of a first mode, and another display corresponds to display of a second mode. Further, in each display processing, a state displayed on the display 73 to receive user operations and inputs corresponds to an input mode. In a first embodiment, input in different input modes is enabled for each display processing corresponding to the first to the fourth conditions. It can be ascertained which input mode is to be used when the display of the display 73 is viewed, but this may be notified to the user using sound or vibration.

The right-side and left-side display processing described above will be described using FIG. 7. In the display processing, a display mode for receiving an input operation on the display 73 and an input operation in an input mode specified in accordance with the display mode are implemented. While the processing is actually performed by the UI app 84 and the input event detection unit 82, the following description summarizes a series of processing performed by the control device 70. In addition, although the right-side display processing (step S210) and the left-side display processing (step S220) are illustrated as separate processing in FIG. 6, both kinds of display processing are illustrated and described here in conjunction with FIG. 7 because they have similar processing content. In addition, because the display by the image display unit 20 and the display of the control device 70 by the display 73 are presented in the processing illustrated in FIG. 7, the display units will be distinguished by referring to the image display unit 20 as a first display unit 20, and the display 73 as a second display unit 73.

Figure 7:
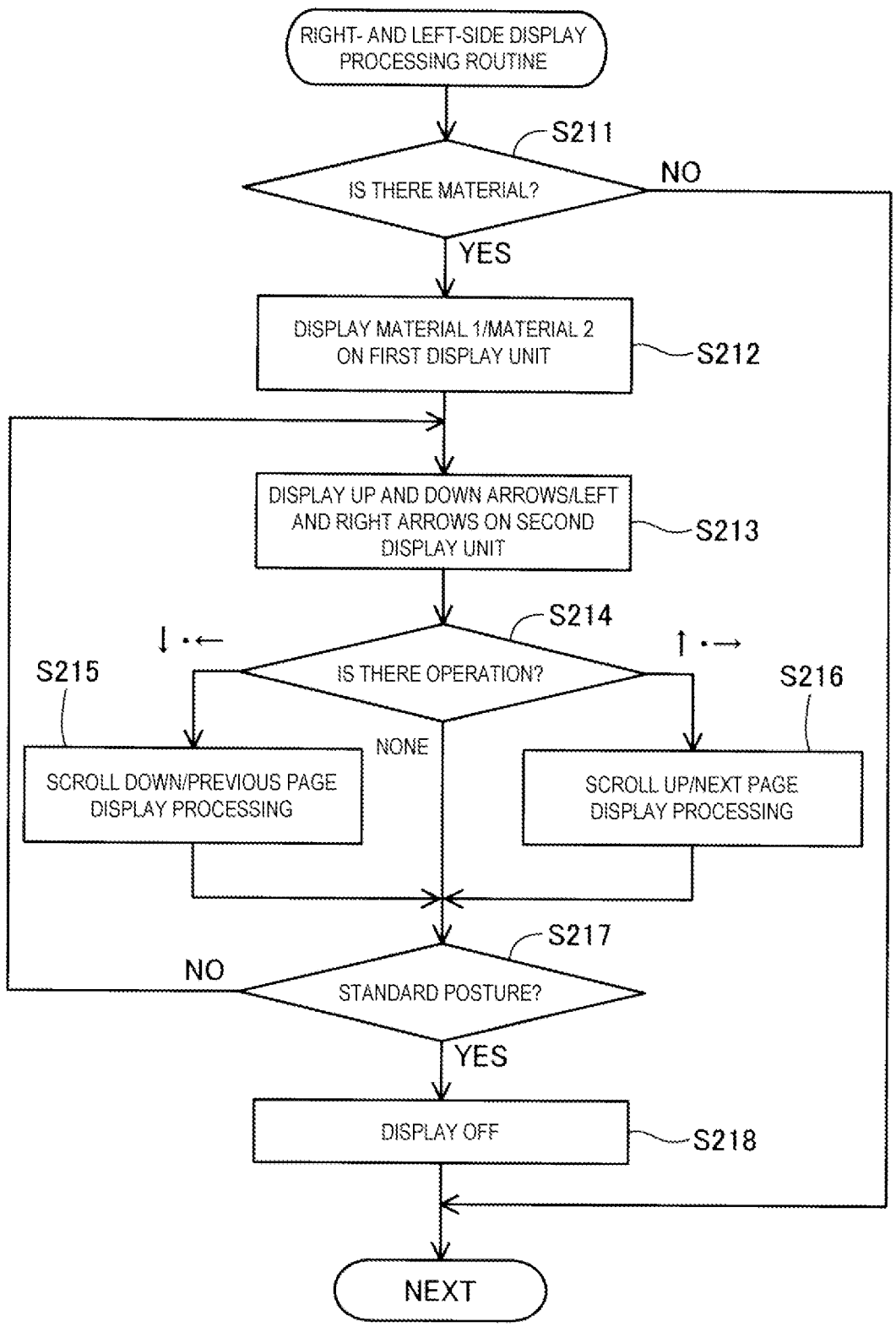
FIG. 7 is a flowchart showing a right side and left-side display processing routine in the display process.

When the processing illustrated in FIG. 7 is started, whether there is a material to be displayed is first determined (step S211). If a material to be displayed is not ready, the processing proceeds to "NEXT" to end the present processing routine without performing any processing. Normally, because a material to be displayed is prepared (step S130 in FIG. 4), the control device 70 then causes the first display unit (image display unit) 20 to display material 1 (in the case of the right-side display processing) or material 2 (in the case of the left-side display processing) (step S212). Thereafter, the control device 70 causes the second display unit (display) 73 to display up and down arrows for scrolling (in the case of the right-side display processing) or left and right arrows for page flipping (in the case of the left-side display processing) (step S213).

Figure 8:
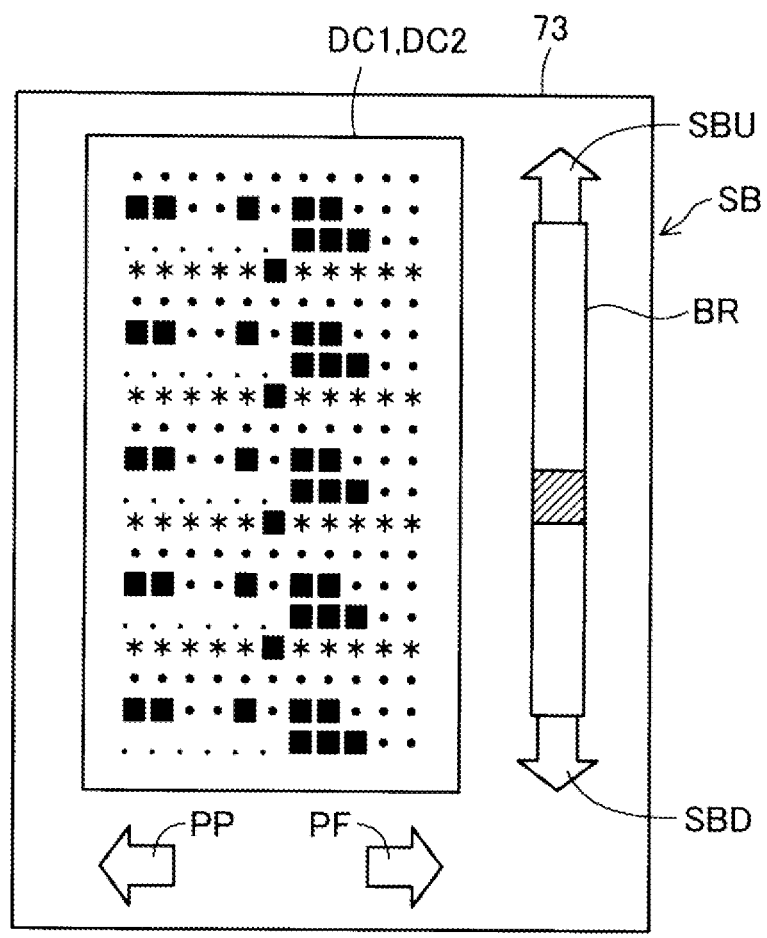
FIG. 8 is an explanatory diagram illustrating an example of display on right and left sides.

An example of the display of the second display unit 73 is illustrated in FIG. 8. Although the displays DC1 and DC2 corresponding to the materials 1 and 2 are also displayed on the second display unit 73, they need not be readable materials, and may be dummy displays for visually recognizing display positions of the materials corresponding to the actual materials 1 and 2 displayed on the first display unit 20. In the right-side display processing, a bar BR constituting a scroll bar SB and an up arrow SBU and a down arrow SBD are displayed on the right side of the dummy display DC1. On the other hand, in the left-side display processing, a left arrow PP and a right arrow PF for page flipping are displayed on the lower side of the dummy display DC2. In other words, in the cases of the right-side display processing and the left-side display processing, the input modes are different.

After the display on the first display unit 20 (step S212) and the display on the second display unit 73 (step S213), it is determined whether an input operation using the second display unit 73 has been performed (step S214). The second display unit 73 includes the touch panel 72 overlaid on the display unit 71, and thus can receive operations from a user as described above. The specific processing is performed by the input event detection unit 82. When the input event detection unit 82 analyzes a signal from the touch panel driver 76, that is, data indicating what degree of strength and which part of the second display unit 73 with respect to a touch of the user and the UI app 84 determines that the user has touched the location corresponding to any of the arrows SBU and SBD constituting the scroll bar SB displayed on the second display unit 73 and the arrows PP and PF for forward and backward page flipping with a constant or greater intensity, the input event detection unit 82 outputs to the OS 81 the occurrence of the event in which the user has operated any of the arrows set by the UI app 84.

Specifically, if it is determined that the down arrow SBD has been operated in the processing of step S214 in the right-side display processing, scrolling-down is performed (step S215). The scrolling-down is processing to scroll the material 1 displayed on the first display unit 20 in the downward direction. As a result, the material 1 displayed as the display DC1 (see screen RG in FIG. 5) on the first display unit 20 is scrolled in the downward direction, and the portion that was hidden until then becomes visible. When it is determined that the arrow PP for backward page flipping has been operated in the left-side display processing, backward page flipping is performed (step S215). The backward page flipping is processing to display the previous page of the material 2 displayed on the first display unit 20. As a result, the previous page of the material 2 displayed as the display DC2 (see the screen LG in FIG. 5) on the first display unit 20 is displayed and visible.

On the other hand, when it is determined that the up arrow SBU has been operated in the processing of step S214 in the right-side display processing, scrolling-up is performed (step S216). The scrolling-up is processing for scrolling the material 1 displayed on the first display unit 20 in the upward direction. As a result, the material 1 displayed on the first display unit 20 is scrolled in the upward direction, and the portion that was hidden until then is visible. When it is determined that the arrow PF for forward page flipping has been operated in the left-side display processing, forward page flipping is performed to display the next page of the material 2 (step S216). As a result, the next page of the material 2 displayed on the first display unit 20 is displayed and visible.

After the processing (steps S215 and S216) or during a predetermined period of time, when the input event detection unit 82 has not detected an event, it is determined in the next step S217 whether the posture of the user has returned to the standard posture. When the user facing the right or left side has not returned his or her head to its original position, that is, the position directly opposite to the target object OBJ on the desk, the processing returns to step S213 to repeat the processing of steps S213 to S217 described above. On the other hand, if the user returns his or her head to the standard posture, the processing in step S217 is determined as "YES", and the control device 70 turns off the display of the first display unit 20 and the second display unit 73 (step S218), and goes to "NEXT" to temporarily end the display processing routine.

As described above, if the user dos not return his or her face to the standard posture, the display on the first display unit 20 and the display and input on the second display unit 73 are continued, and thus, even when the user performs an input operation viewing the control device 70 placed below while the information DC1 and the DC 2 are being displayed and the user is viewing the right or left side, the display and the like on the first display unit 20 are maintained without change. In addition, it is not necessary to set turn-off of the display on the first display unit 20 or the second display unit 73 to be triggered by detection of return to the standard posture, and the display may return to initial display (step S160 in FIG. 4) when there is a provided button such as "return to display of standard posture" on the second display unit 73 and an explicit input operation by the user.

When the display processing illustrated in FIG. 7 is ended by returning the head to the standard posture, the control device 70 proceeds to the determination of whether the processing described above is to be ended (step S185 in FIG. 4), and if conditions such as those for whether to end the target app 83 or the like are not satisfied, the processing described above is repeated from the initial display processing (step S160).

According to the processing described above, information displayed on the right side or the left side can be easily scrolled or subjected to page flipping, and thus information that is not displayed at one time can be viewed. Note that, although information that is not displayed at one time on the first display unit 20 is shown by scrolling or page flipping in this example, a range of visible information may be changed by changing an enlargement/reduction ratio or a display size of the content. Alternatively, the display position of the content and the display range of the content may be changed. In addition, it is also possible to use the information being displayed, such as by making a mark on the content, through a button operation on the second display unit 73.

Figure 9:
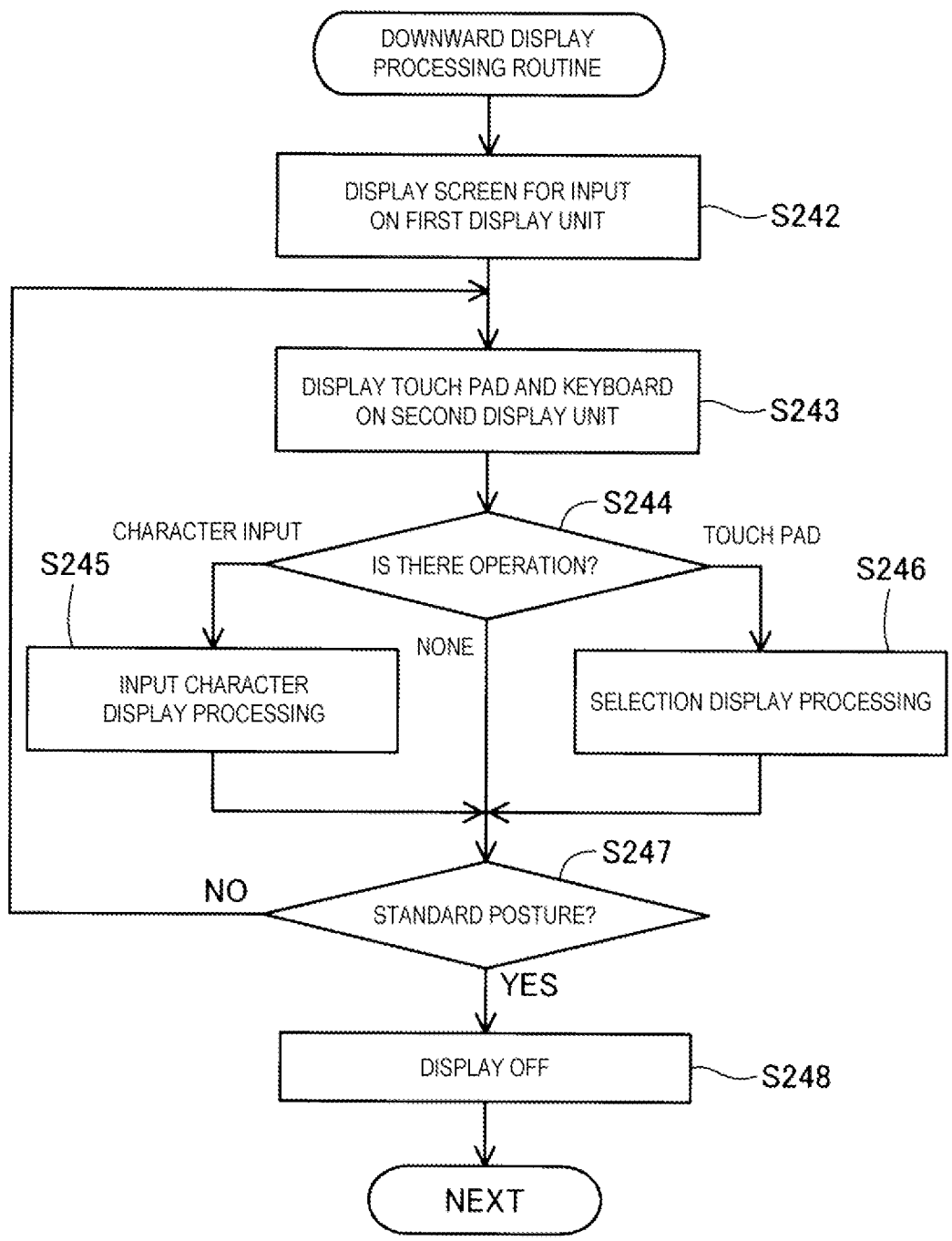
FIG. 9 is a flowchart showing a lower side display processing routine in the display process.

In this way, while repeating the processing of FIG. 4, if a movement of the head satisfies the condition, the display corresponding to the condition and the input in the input mode are enabled. For example, if the movement of the head of the user satisfies Condition 4, the control device 70 performs the downward display processing (step S240) shown in FIG. 6. Details of this processing are shown in FIG. 9.

Figure 10:
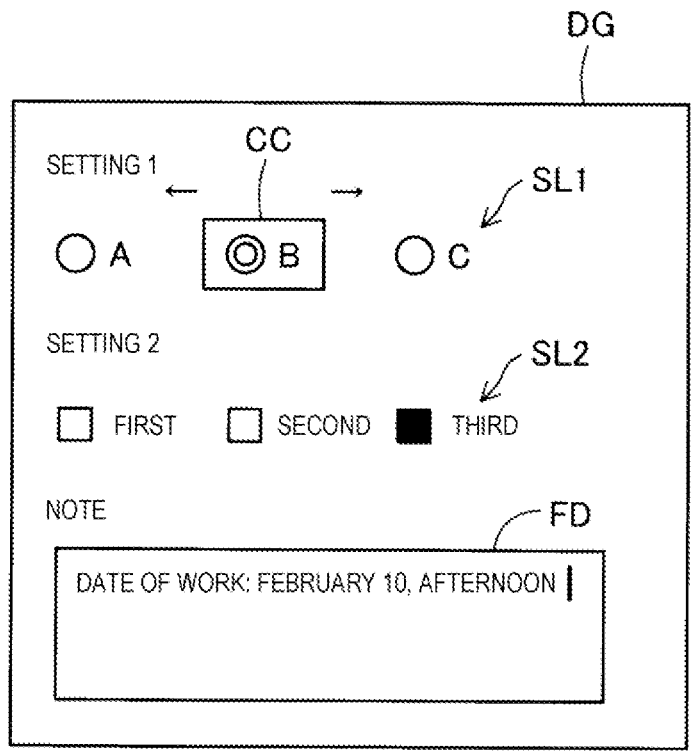
FIG. 10 is an explanatory diagram illustrating an example of lower side display.

When the downward display processing is started, the control device 70 causes the first display unit (image display unit) 20 to display a screen for input (step S242). An example of the screen for input is illustrated in FIG. 10. In this example, option SL1 for setting 1, option SL2 for setting 2, and further field FD for inputting text are displayed. Setting 1 is an example in which three radio buttons are displayed as option SL1, and any radio button is exclusively selected. Setting 2 is an example in which three check boxes are displayed as option SL2 and multiple selections are allowed.

Figure 11:
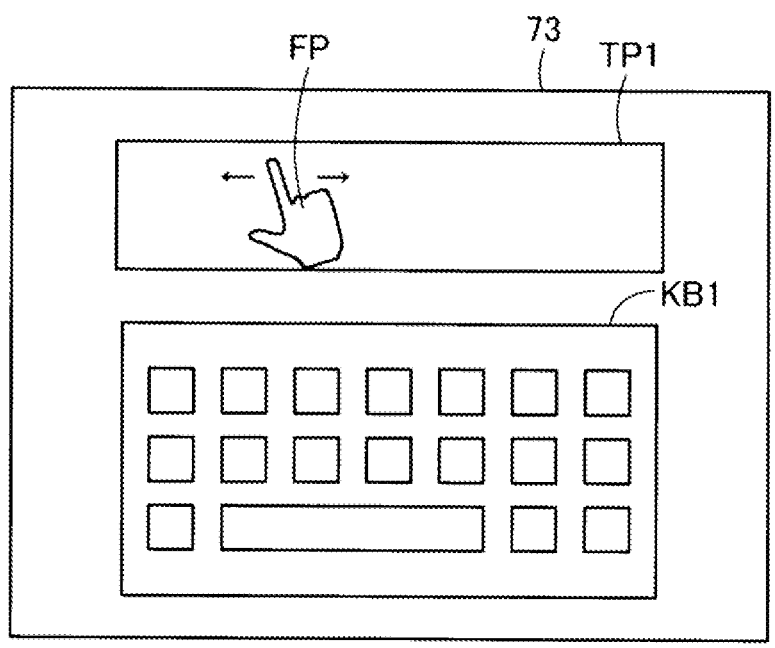
FIG. 11 is an explanatory diagram illustrating another example of the lower side display.

Following the display on the first display unit 20, the control device 70 causes the second display unit (display) 73 to display a trackpad or a keyboard (step S243). An example of this display is illustrated in FIG. 11. In the downward display processing, a trackpad TP1 is displayed on the top of the second display unit 73, and a keyboard KB1 is displayed below the trackpad. Originally, the display is prepared by the UI app 84 and realized by the OS 81 writing data to be displayed into the display unit 71 via the display driver 78.

After the display on the first display unit 20 (step S242) and the display on the second display unit 73 (step S243), it is determined whether an input operation using the second display unit 73 has been performed (step S244). The second display unit 73 includes the touch panel 72 overlaid on the display unit 71, and thus can receive operations from the user as described above. Specific processing is as described in the right-side display processing and the like, and when it is determined that the user has touched a location corresponding to the trackpad TP1 or a key of the keyboard KB1 illustrated in FIG. 11 with a constant or greater strength, the input event detection unit 82 regards the determination as the occurrence of an event set by the UI app 84, in which either the trackpad TP1 or the keyboard KB1 has been operated, and outputs the event to the OS 81.

As a result, selection display processing (step S246) is performed when it is determined that a finger FP of the user traces the surface of the trackpad TP1 to the right and left sides, or input character display processing (step S245) is performed when it is determined that the user taps at the position of each key of the keyboard KB1 with the finger FP. The selection display processing is processing in which a cursor cc on options SL1 and SL2 on the screen DG displayed in the first display unit 20 illustrated in FIG. 10 is moved in a direction of the finger FP tracing the surface of the track pad TP1 to allow the user to tap on the surface of the trackpad TP1 with the finger FP and select the option at the position at which the cursor CC is present. In addition, the input character display processing is processing of inputting characters corresponding to keys operated on the keyboard KB1 illustrated in FIG. 10 into the field FD on the screen DG displayed on the first display unit 20 and displaying the characters.

After the processing (steps S245 and S246) or during a predetermined period of time, when the input event detection unit 82 does not detect any event, it is determined in the next step S247 whether the posture of the user has returned to the standard posture. If the user facing downward has not returned his or her head to the original position, i.e., the position directly opposite to the target object OBJ on the desk, the processing then returns to step S243 to repeat the processing of steps S243 to S247 described above. On the other hand, if the user returns his or her head to the standard posture, the processing in step S247 is determined as "YES", and the control device 70 turns off the display of the first display unit 20 and the second display unit 73 (step S248), and goes to "NEXT" to temporarily end the display processing routine.

When the display processing illustrated in FIG. 9 is ended by returning the head to the standard posture, the control device 70 proceeds to the determination of whether the processing described above is to be ended (step S185 in FIG. 4), and thus if the condition such as whether to end the target app 83 or the like is not satisfied, the processing described above is repeated from the initial display processing (step S160). For example, if the movement of the head of the user satisfies Condition 4, the control device 70 performs the upward display processing (step S230) shown in FIG. 6. This processing is to setting display in the HMD 100. The setting of the display refers to what information or screen display is assigned in which direction when viewed in the standard posture. Details of this processing are omitted in the description.

A-4. Actions and Effects of First Embodiment

According to the first embodiment described above, when a user using the HMD 100 performs processing such as repair, assembly, or the like on a target object OBJ present in an outside scene that is visible through the image display unit 20, the user moves his or her head from a standard posture in which the user faces the target object OBJ to cause information supporting the processing or information necessary for settings, and the like to be displayed at a position associated with the direction and a magnitude of acceleration of the movement of the head. Moreover, in this case, various kinds of information, setting screens, and the like can be displayed on the display 73 of the control device 70 in different display modes in the left, right, upward, and downward directions, and input in an input mode associated with the display mode is possible. Thus, the user can refer to desired information, or can input a setting or text, or the like simply by moving his or her head in a predetermined direction from a standard posture at an acceleration higher than or equal to a predetermined threshold value, As a result, processing such as repair, assembly, or the like for the target object OBJ becomes easy.

Furthermore, because the input processing is performed on the display 73 integrated with the touch panel 72 in the first embodiment, it is not necessary to employ input processing using the image display unit 20, for example, input processing such as detecting a direction of the line-of-sight and shielding the line-of-sight by the eyelids. Because it is easy to set the input processing to be similar to normal processing using the touch panel 72, for example, input processing with the mobile terminal 110, or the like, input operations can be simplified and intuitive. Moreover, in this embodiment, by changing the display of the display unit 71 of the display 73, various input modes, such as the scroll bar SB, the buttons PP and PF in the form of an arrow for page flipping, the options SL1 and SL2, the field FD for text input, and the like can be realized.

Moreover, because such a variety of input modes are provided by UI app 84 and the input event detection unit 82 controlled by the OS81 at the level of the operating system for the environment in which the target app 83 operates, it is also easy to implant the target app 83 operating on a mobile terminal or the like on which a similar operating system is mounted.

In addition, in the first embodiment, if the target object OBJ present in the outside scene captured by the video cameras 61R and 61L provided in the image display unit 20 is a registered target object, the user can refer to information prepared for the target object OBJ at any time. Thus, by simply having the image display unit 20 which can be displayed in a see-through manner, worn as eyeglasses, information related to a work target is easily accessible.

B. Second Embodiment

Figure 12:
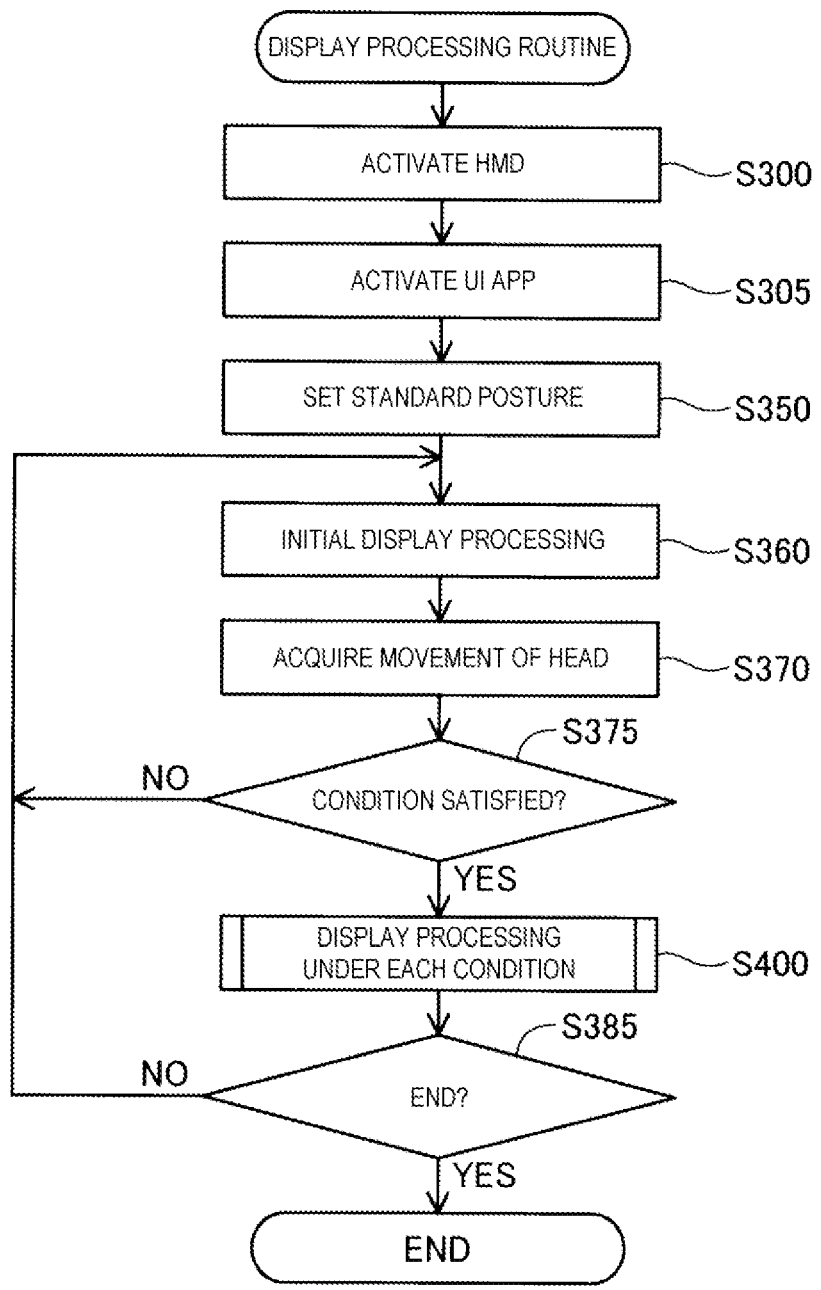
FIG. 12 is a flowchart showing a display processing routine according to a second embodiment.

Next, a second embodiment will be described. An HMD 100 of the second embodiment has a similar hardware configuration to that of the first embodiment, and the processing performed by the control device 70 is different. FIG. 12 is a flowchart showing a display processing routine executed by the control device 70 in the second embodiment. In the second embodiment, other processing is similar except that steps S110 through S130 of the first embodiment are not included.

In the HMD 100 of the second embodiment, when the processing starts, the control device 70 sends power to the image display unit 20 via the coupling cable 40 to activate the entire HMD 100 (step S300). Thereafter, the control device 70 activates the UI app 84 before starting the target app 83 (step S305). Subsequently, similar to the first embodiment, the control device 70 sets a standard posture (step S350).

When the standard posture is set, the initial display processing is then performed in the same manner as in the first embodiment (step S360), and processing is further performed to acquire the movement of the head based on information from the six-axis sensor 66 provided in the image display unit 20 (step S370). The movement of the head can be determined in the same manner as in the first embodiment, such as when the movement is a movement in a predetermined direction exceeding a predetermined first threshold value value.

After acquiring the movement of the head, it is determined whether the movement satisfies a predetermined condition (step S375), and if the condition is satisfied, display processing corresponding to each condition is performed (step S400). Details of the display processing (step S400) will be described later. If the condition is not satisfied (step S375: "NO"), the processing returns to step S360 to repeat the processing described above. On the other hand, when the condition is satisfied and the display processing (step S400) is performed, it is then determined if the work is to be ended (step S385), and when the control device 70 ends the target app 83 or the control device 70 is turned off, the processing proceeds to "END" to end the present processing routine. If it is determined that the processing is not to be ended, the processing returns to step S360 to repeat the above-described processing.

Figure 13:
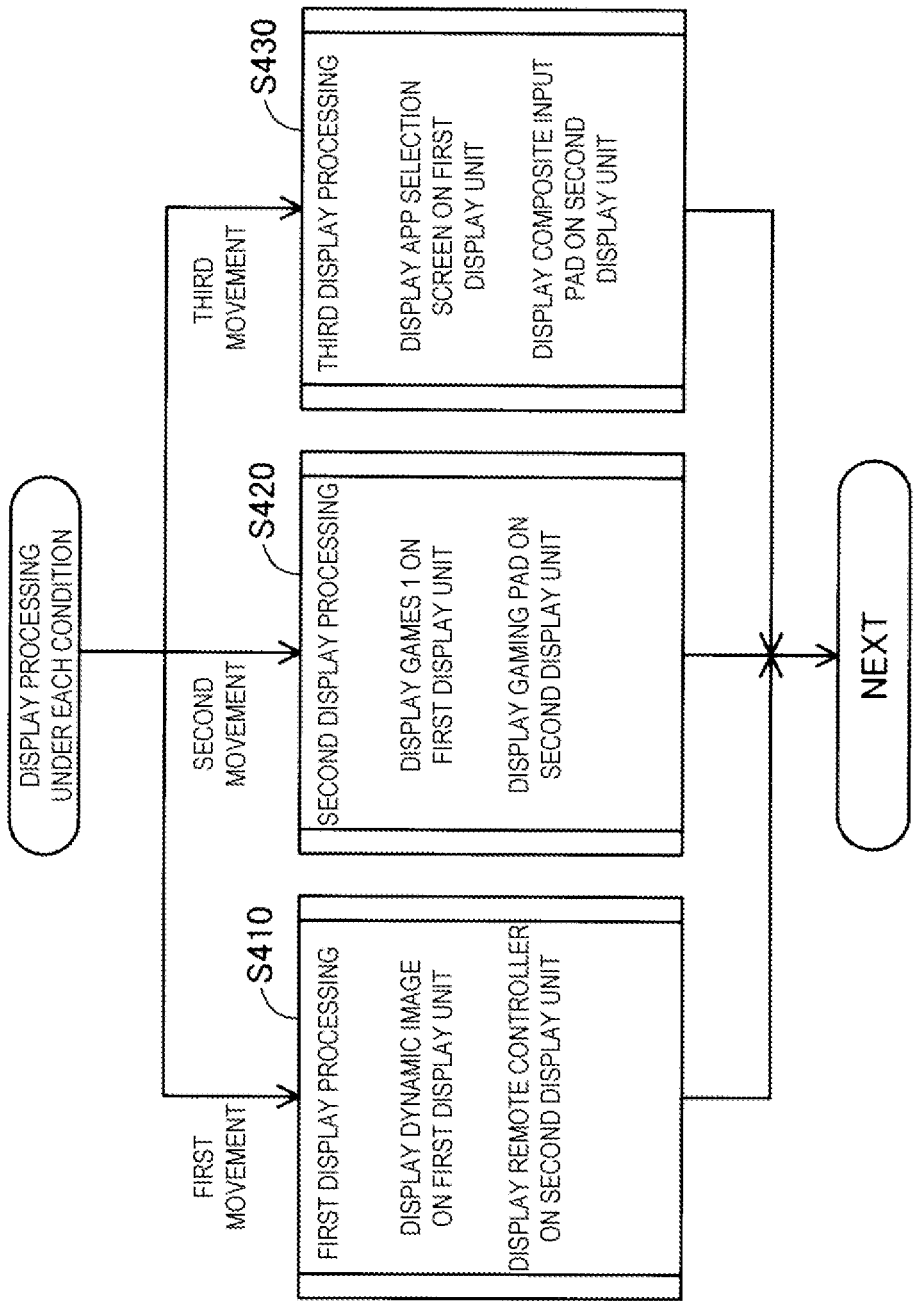
FIG. 13 is a flowchart showing a display process under each condition.

Next, the processing of step S400 in FIG. 12, that is, the display processing when each condition is satisfied, will be described using FIG. 13. When the movement of the head satisfies the predetermined condition in step S375, the control device 70 performs the next display processing under each condition. In the example illustrated in FIG. 13, there are three types of conditions for detecting a movement of the head and display processing applied to such cases.

1 Condition 1: When the Head Faces the Right Side

When it is determined based on a signal from the six-axis sensor 66 that the head faces the right side at a predetermined angle (here, 40 degrees) or more from the standard posture, an application program for playing back a dynamic image is activated as the target app 83, the image display unit 20, which is the first display unit, displays the dynamic image while the display 73, which is the second display unit, displays a remote controller, and thereby input in an input mode using the remote controller is possible (step S410).

2 Condition 2: When the Head Faces the Left Side

When it is determined based on a signal from the six-axis sensor 66 that the head faces the left side at a predetermined angle (here, 40 degrees) or more from the standard posture, a program for game 1 is activated as the target app 83, the image display unit 20, which is the first display unit, displays a screen of the game 1 while the display 73, which is the second display unit, displays a gaming pad, and thereby input in an input mode using the gaming pad is possible (step S420).

3 Condition 3: When the Head Faces Downward

When it is determined based on a signal from the six-axis sensor 66 that the head faces downward at a predetermined angle (here, 15 degrees) or more from the standard posture, a program for selecting an application program is activated as the target app 83, the image display unit 20, which is the first display unit, displays an app selection screen while the display 73, which is the second display unit, displays a composite input pad, and thereby input in an input mode using the composite input pad is possible (step S430).

After any of the above-described determination and display processing (steps S410 to S430) is performed, the processing proceeds to "NEXT" to end the processing routine.

Figure 14A:
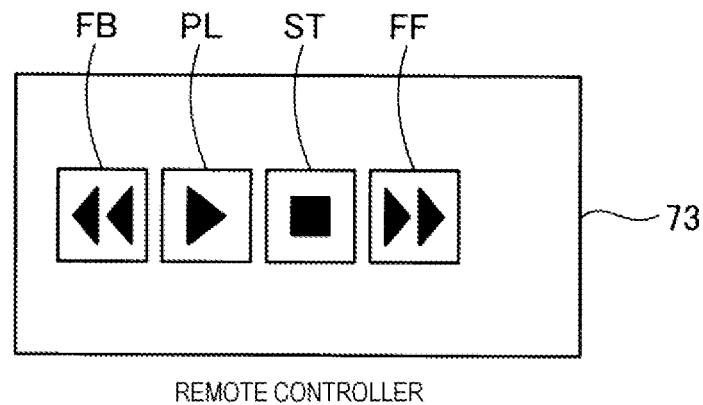
FIG. 14A is an explanatory diagram illustrating an example of display in a second display unit of a control device.

The display of the second display unit 73 and the input mode in each display processing (steps S410 to S430) described above will be described. FIG. 14A is a schematic diagram illustrating a remote controller displayed in the second display unit 73 under Condition 1. The remote controller is displayed with a playback button PL to instruct playback of a dynamic image displayed in the first display unit 20, a stop button ST to instruct a stop, a fast-forward button FF to instruct fast forward of the dynamic image, a rewind button FB to instruct rewinding of the dynamic image, and the like. When the user touches any of the buttons viewing the display of the remote controller of the second display unit 73, the input event detection unit 82 detects an operation on the touch panel 72 via the touch panel driver 76, determines which button has been pressed, and outputs an event assigned to the button, i.e., an event such as start of playback, stop, fast forwarding, rewinding of a dynamic image, or the like to the target app 83. As a result, the dynamic image displayed on the first display unit 20 is played back, stopped, fast forwarded, or rewound.

Figure 14B:
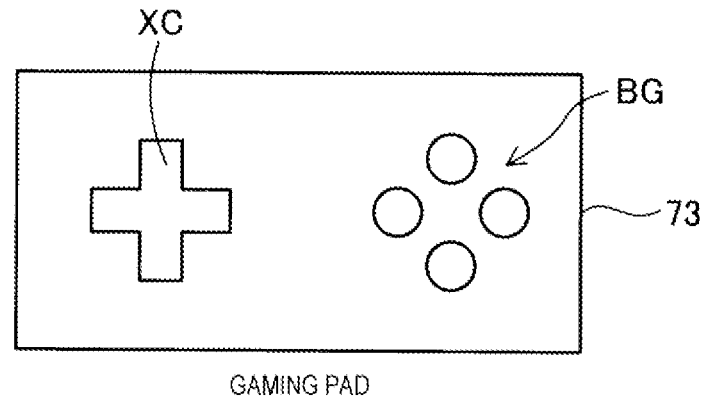
FIG. 14B is an explanatory diagram illustrating another example of display in the second display unit of the control device.

In addition, FIG. 14B is a schematic diagram illustrating a gaming pad displayed under condition 2. The gaming pad displays a cross key XC and four selection buttons BG. When the user operates a cross key XC of the gaming pad displayed on the second display unit 73 or taps on any of buttons BG as necessary while viewing the game displayed on the first display unit 20, the input event detection unit 82 detects the operation of the touch panel 72 via the touch panel driver 76 and determines in which direction the cross key XC has been operated or determines which of the buttons BG has been pressed, and instructs an event assigned to the button or a movement of a target character, a weapon, or the like, in upward, downward, left, or right direction, or outputs an event such as specification of an operation of a weapon to the target app (here, the game) 83. As a result, the character displayed in the first display part 20 moves or the weapon is manipulated.

Figure 14C:
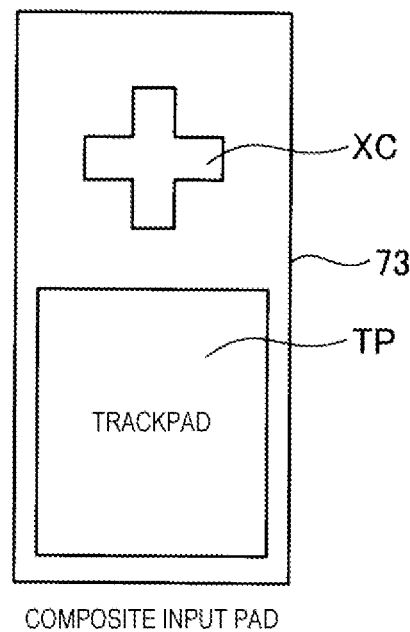
FIG. 14C is an explanatory diagram illustrating another example of display in the second display unit of the control device.

In addition, FIG. 14C is a schematic diagram illustrating a composite input pad displayed under condition 3. A cross key XC and a trackpad TP are displayed in the composite input pad. When the user operates the cross key XC of the composite input pad displayed on the second display unit 73 or taps or drags on the trackpad TP as necessary while viewing a selection screen for an application program displayed on the first display unit 20, the input event detection unit 82 detects the operation of the trackpad TP via the touch panel driver 76 and determines in which direction the cross key XC has been operated or identifies the movement of the finger on the trackpad TP, and instructs a movement of a cursor on a selected screen in upward, downward, left, or right direction, or outputs an event such as selection of a desired application program to the target app (here, a program for selecting the application program) 83. As a result, an application program displayed in the first display unit 20 is selected and, in some cases, activated.

Even in the second embodiment described above, content to be displayed is changed according to a direction and a magnitude of a movement of the head of the user wearing the HMD 100 and an input method in an input mode according to the displayed content is provided as in the first embodiment. Thus, similar effects to those of the first embodiment, such that the user can view a screen in which his or her desired information and the like are displayed due to the movement of the user and can perform input in an input mode suitable for the screen can be.

Figure 14D:
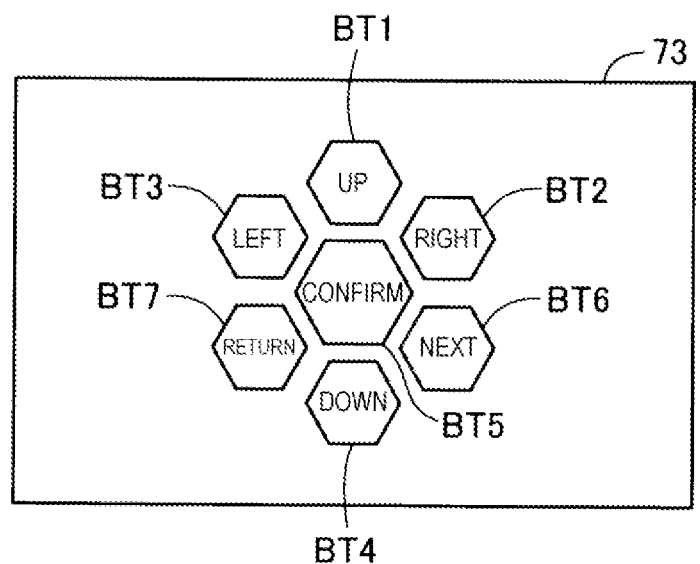
FIG. 14D is an explanatory diagram illustrating another example of display in the second display unit of the control device.

Although various input mechanisms such as a remote controller, a gaming pad, or a composite input pad are displayed as each input mode on the display 73 as the second display unit of the control device 70 in the second embodiment, an input mechanism suitable for the input mode is not limited thereto. For example, as illustrated in FIG. 14D, an input means with a hexagonal shaped button may be displayed on the display 73 to allow the user to manipulate each button. In this example, in addition to the buttons BT1 to BT4 which move the cursor displayed on the image display unit 20 as the first display unit in each of the upward, downward, left, and right directions, a button BT5 for confirmation, buttons BT6 and BT7 for getting the game forward and backward, and the like may be displayed and selected. Further, such a hexagonal-shaped button may be arranged outside the buttons BT1 to 7. An input mode in which buttons having a shape of filling such planes (triangular shape, square shape, hexagonal shape, or a combination of multiple shapes) are arranged to provide many options is also possible.

Figure 14E:
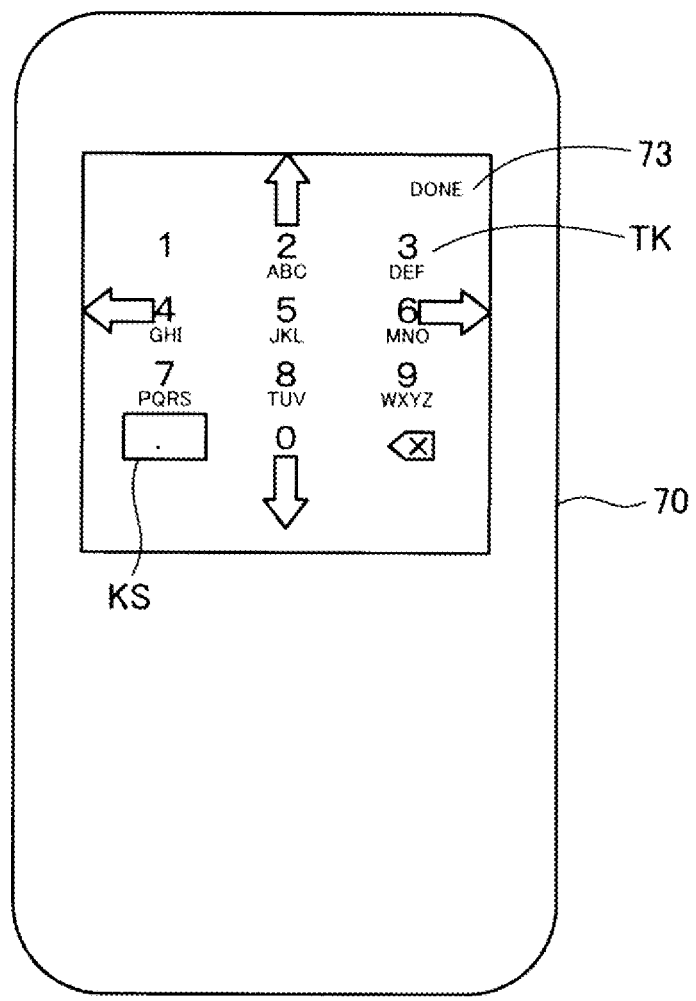
FIG. 14E is an explanatory diagram illustrating another example of display in the second display unit of the control device.

Alternatively, as illustrated in FIG. 14E, an input mechanism using a numeric keypad used in mobile phones or the like can also be employed. In this example, the numeric keypad is displayed on the display 73, and when a location corresponding to each key is touched, a square-shaped cursor KS indicating that the key has been selected is displayed, and thus a number or alphabet can be input. Originally, each key may be flipped left, right, up, and down to selectively input a plurality of types of characters. Furthermore, in this example, because the entire display region also functions as the trackpad TP, it is possible to use a cursor, a character, or the like displayed on the image display unit 20 to move in any direction. Because the numeric keypad can be used to input alphabets, Japanese Kana characters, and the like associated in advance with the keys by touching the keys multiple times within a predetermined time, and it is also easy to input text with a mixture of Japanese Kana and Chinese characters, in combination with Japanese Kana-Chinese character conversion.

Although several input modes have been described above, these input modes may be combined, or may be switched on the same display screen as required by the user. The input mode switching is performed by combining the direction in which the head of the user moves as a movement of the head with a determination that the magnitude of the movement exceeds the threshold value. When the magnitude of the movement is determined as an angle of the head, a threshold value angle can be arbitrarily set. Because a so-called discriminative visual field in which a person gazes an object for visual recognition is within the range of approximately 5 degrees, for example, if an angle of the head exceeds the value, the head may be determined to face the left or right direction. Alternatively, because an effective visual field in which a person can receive information simply by eye movement is approximately 30 degrees in the left and right directions and approximately 20 degrees in the vertical direction, if the head moves by an angle exceeding the above angles, the user may be determined to have moved his/her head and have tries to see a different direction from the standard posture. Furthermore, in consideration of the fact that a stable field of fixation in which a person can comfortably gaze an object only with a movement of the eyeballs and a motion of his or her head without moving the trunk is 60 to 90 degrees in the left-right direction (widths differ depending on individuals) and 45 to 70 degrees in the up-down direction (widths differ depending on individuals), if a value exceeds the ranges, the person is determined to be viewing the object in a different direction using not only the movement of the head but also the entire body and thus the display mode can be changed. Note that a magnitude of the movement is not limited to an angle, and may be determined by an angular velocity, various accelerations, or a combination thereof.

In the first and second embodiments, although the HMD 100 and the control device 70 are coupled using a wire, they may be coupled wirelessly using Wi-Fi (registered trademark), BlueTooth (registered trademark), or the like. In addition, although, the HMD 100 enables outside scenes to be visually recognized as a see-through type in the above-described embodiments, the image display unit 20 and the like may be configured as a non-transparent display device, an outside scene captured by the video cameras 61R and 61L may be displayed on the non-transparent display device, and thus a display device that enables the outside scene to be substantially visually recognized may be configured.

C. Other Embodiments (1) The present disclosure can also be implemented in the following aspects. One aspect is an aspect of a head-mounted display device capable of enabling an outside scene to be visually recognized, and the display device may include an image display unit configured to display an image; an input unit coupled to the display unit and enabling input in at least a plurality of input modes; a setting unit configured to set, as a standard posture, a specific posture of the head of a user wearing the display device; a detection unit configured to detect a movement of the head of the user wearing the display device from the standard posture; a display control unit configured to associate a movement of the head with a first mode and a second mode that is different from the first mode, that are display modes of the image display unit, and cause the image display unit to perform display in the first mode when the detected movement of the head is a movement in a predetermined first direction and exceeds a predetermined first threshold value and perform display in the second mode when the movement is a movement in a second direction that is different from the first direction and exceeds a predetermined second threshold value; and an input control unit configured to cause the input unit to accept the input in an input mode associated in advance with the first mode or the second mode of the image display unit among the plurality of input modes when the image display unit performs display in the first mode or the second mode.

In this way, movements of the head are associated with the first mode and the second mode different from the first mode that are display modes of the image display unit, display is performed in the first mode or the second mode depending on a detected movement of the head, and when display is performed in the first mode or the second mode, input in an input mode associated in advance with the first mode or the second mode among the plurality of input modes is possible. A movement of the head can be determined based on a direction of the head and a parameter combined with the direction, such as an angle of the head, a motion or rotation speed of the head, and an acceleration thereof. Note that an angle, a velocity, an acceleration, and the like may be detected as a scalar quantity, may be determined in combination with a direction, or may be detected as a vector quantity including a direction from the beginning.

(2) In the display device, the display control unit may control the image display unit in a mode in which visual recognition of the outside scene is prioritized in the standard posture, and in the first mode and the second mode, first information and second information associated in advance with the modes may be displayed on the image display unit. In this way, visual recognition of the outside scene is prioritized in the standard posture, and in the first and second modes, the first information and the second information associated in advance with the modes can be viewed. Thus, information about a target object present in the outside scene, information related to the outside scene, and the like can be easily viewed.

(3) In the display device, the first direction may be a downward direction from the standard posture, the first threshold value may be a threshold value for detecting that at least one of a depression angle, a speed, and an acceleration of the head is greater than or equal to a predetermined value, the display control unit may cause the image display unit to display, in the first mode, information for receiving a data input as the first information, and the input control unit may cause at least one of a numerical value, a character, and selection of an option to be input by input in an input mode using the first information. In this way, when the user faces downward from the standard posture, input can be performed in an input mode to input at least one of a numerical value, a character, and selection of an option. Of course, similar display and input in an input mode may be performed at an elevation angle with consciousness.

(4) In the display device, the second direction may be a right direction or a left direction from the standard posture, and the second threshold value may be a threshold value for detecting that at least one of an angle, a speed, and an acceleration of the head is greater than or equal to a predetermined value, the display control unit may cause the image display unit to display, in the second mode, predetermined content including at least one of a character, an image, and a video as the second information, and the input control unit may receive an input in an input mode for changing a display mode of the displayed content. In this way, the predetermined content including at least one of a character, an image, and a video can be displayed as the second information in the right direction or the left direction rather than in a view range of the standard posture, and the display mode of the displayed content can be changed. Thus, desired content can be easily referred to.

(5) In the display device, the display mode of the content to be changed by the input control unit may be at least one of an enlargement/reduction ratio or a display size of the content, a display position of the content, a display range of the content, scrolling of the content, page flipping of the content, and marking on the content. In this way, the display mode of the displayed content can be easily changed.

(6) In the display device, the display control unit may cause the image display unit to display association information for associating a movement of the head with the first mode and the second mode when the movement of the head is detected as a movement in an upward direction from the standard posture and at least one of an elevation angle, a speed, and an acceleration of the head is greater than or equal to a predetermined value, and the input control unit may receive an input in an input mode using the association information and associate the movement of the head with the first mode and the second mode. In this way, a relationship between the display of the first and second modes displayed separately from the standard posture and the movement of the head can be freely combined in the display device. A display mode is not limited to the first and second modes, and three or more modes may be set. In this case, in addition to the four display modes in the upward, downward, left, and right directions, the display locations may be extended to at least one of upper right, upper left, lower right, and lower left. Of course, the display location may be circular and display may be performed in a larger number of modes.

(7) In the display device, the detection unit may be a multi-axis sensor configured to detect an angle and an acceleration in the upward, downward, left, and right directions of the head, the setting unit may set the standard posture based on a first detection value for the angle from the multi-axis sensor, and the display control unit may set each of the first threshold value and the second threshold value individually for both the first detection value for the angle from the multi-axis sensor and a second detection value for the acceleration. In this way, a change of the head from the standard posture can be detected with high accuracy. Of course, such determination may be made only based on the angle or acceleration of the head. If the determination is made based on an acceleration, it is possible to easily distinguish a movement of the head slowing turning to look around from a movement to see the display of the first and second modes. In addition, the multi-axis sensor used may be a six-axis sensor, or may be a single-axis (for angle or acceleration) or a two-axis (for angle and acceleration) sensor, or a combination thereof, specialized only in the detected direction.

(8) In the display device, the first detection value may be a detection value at which it is possible to distinguish a direction of a posture of the head among the upward, downward, left, and right directions when viewed in the standard posture, and the first threshold value and the second threshold value may have different threshold values for the first detection value. In this way, the display in each direction can be individually set.

(9) In the display device, the display control unit may cause the image display unit to display auxiliary display indicating the corresponding input mode in the display of the standard posture, the first mode, and the second mode. In this way, the user can easily ascertain which input mode is realized in the first mode and the second mode.

(10) In the display device, the input control unit may notify that the input is possible in one input mode among the plurality of input modes using sound or vibration. In this way, the user can easily ascertain what the current input mode is.

(11) The present disclosure can also be implemented as a control method for a display device including a head-mounted image display unit capable of enabling an outside scene to be visually recognized. The control method for the display device may be configured to set, as a standard posture, a specific posture of the head of a user wearing the display device; to detect a movement of the head of the user wearing the display device from the standard posture; to associate the movement of the head in advance with a first mode and a second mode that is different from the first mode, which are display modes of the image display unit and to cause the image display unit to perform display in the first mode when the detected movement of the head is a movement in a predetermined first direction and exceeds a predetermined first threshold value and perform display in the second mode when the movement is a movement in a second direction that is different from the first direction and exceeds a predetermined second threshold value; and to receive an input in an input mode associated in advance with the first mode or the second mode of the image display unit among a plurality of input modes when the image display unit performs display in the first mode or the second mode. This configuration provides similar effects to those of the display device of the present disclosure.

(12) In addition, the present disclosure can also be implemented as a computer-executable program for controlling a display device provided with a head-mounted image display unit capable of enabling an outside scene to be visually recognized. This program realizes a setting function to set, as a standard posture, a specific posture of the head of a user wearing the display device; a detection function to detect a movement of the head of the user wearing the display device from the standard posture; a display function to associate the movement of the head with a first mode and a second mode that is different from the first mode, which are display modes of the image display unit and to cause the head-mounted image display unit to perform display in the first mode when the detected movement of the head is a movement in a predetermined first direction and exceeds a predetermined first threshold value and perform display in the second mode when the movement is a movement in a second direction that is different from the first direction and exceeds a predetermined second threshold value; and an input function to receive an input in an input mode associated in advance with the first mode or the second mode of the image display unit among a plurality of input modes when the image display unit performs display in the first mode or the second mode. When such a program is executed by a computer, similar effects to those of the display device described above can be exhibited.

(13) In each of the above-mentioned embodiments, part of the configuration realized by hardware may be replaced with software. At least part of the configuration realized by software may be realized by discrete circuit configurations. Further, when some or all of the functions of the present disclosure are realized by software, the software (computer program) may be provided in a form stored in a computer-readable recording medium. The "computer-readable recording medium" is not limited to a portable recording medium such as a flexible disk or a CD-ROM, and includes various internal storage devices such as a RAM and a ROM and various external storage devices fixed to a computer such as a hard disk. In other words, the "computer-readable recording medium" has a broad range of definition including any recording medium capable of storing data packets in a fixed manner rather than a non-transitory manner.

The present disclosure is not limited to the embodiments described above, and can be realized in various configurations without departing from the gist of the disclosure. For example, appropriate replacements or combinations may be made to the technical features in the embodiments which correspond to the technical features in the modes described in the Summary to solve some or all of the problems described above or to achieve some or all of the effects described above. In addition, unless the technical features are described herein as essential technical features, such technical features may be deleted appropriately.

What is claimed is:
1. A head-mounted display device comprising:
an image display unit that is mounted on a head of a user and that includes:
   a display unit displays an image and that transmits an outside scene; and
   a camera that captures the outside scene; and
a control device that is coupled to the display unit and that includes:
   an input unit that accepts a first input mode and a second input mode different from the first input mode;
   a detection unit that detects a movement of the head of the user;
   a display control unit that detects a target object from the outside scene and that causes the display unit to display a first image and a second image different from the first image, each of the first image and the second image including information about the target object; and
   a setting unit that sets, as a standard posture, a posture of the head of the user when the display control unit detects the target object, wherein
the display control unit causes the display unit to display the first image when the detection unit detects that the head of the user moves from the standard posture to a first direction beyond a first threshold value,
the display control unit causes the display unit to display the second image when the detection unit detects that head of the user moves from the standard posture to a second direction beyond a second threshold value, the second direction that is different from the first direction,
the input unit accepts the first input mode when the display unit displays the first image, and
the input unit accepts the second input mode when the display unit displays the second image.
2. The head-mounted display device according to claim 1, wherein
the display control unit, in the standard posture, controls the image display unit in a mode in which visual recognition of the outside scene is prioritized.

3. The head-mounted display device according to claim 2, wherein
the first direction is a downward direction from the standard posture,
the first threshold value is a threshold value for detecting that at least one of a depression angle, a speed, and an acceleration of the head is greater than or equal to a predetermined value,
the first image is display information for accepting a data input, and
the first input mode in which at least one of a numerical value, a character, and selection of an option is accepted.

4. The head-mounted display device according to claim 2, wherein
the second direction is a right direction or a left direction from the standard posture,
the second threshold value is a threshold value for detecting that at least one of an angle, a speed, and an acceleration of the head is greater than or equal to a predetermined value,
the second image is content including at least one of a character, an image, and a video, and
the second input mode in which a display mode of the content changes.

5. The head-mounted display device according to claim 4, wherein
the second input mode in which the display mode of the content changes at least one of an enlargement/reduction ratio or a display size of the content, a display position of the content, a display range of the content, scrolling of the content, page flipping of the content, and marking on the content.

6. The head-mounted display device according to claim 2, wherein
the display control unit causes the display unit to display a third image when the detection unit detects that the head of the user from the standard posture to an upward direction beyond at least one of an elevation angle, a speed, and an acceleration, and
the input unit accepts a third input image when the display unit displays the third image.

7. The head-mounted display device according to claim 1, wherein
the detection unit is a multi-axis sensor that detects an angle and an acceleration in the upward, downward, left, and right directions of the head,
the setting unit sets the standard posture based on a first detection value for the angle from the multi-axis sensor, and
the display control unit sets each of the first threshold value and the second threshold value individually for both the first detection value for the angle from the multi-axis sensor and a second detection value for the acceleration.

8. The head-mounted display device according to claim 7, wherein
the first detection value is a detection value with which a direction of a posture of the head with respect to the standard posture is distinguishable from among the upward, downward, left, and right directions, and
the first threshold value and the second threshold value are different threshold values for the first detection value.

9. The head-mounted display device according to claim 1, wherein
the display unit displays a first auxiliary image indicating the first input mode when the input unit accepts the first input mode, and
the display unit displays a second auxiliary image indicating the second input mode when the input unit accepts the second input mode.

10. The head-mounted display device according to claim 1, wherein
the image display unit includes a notify unit notifies using sound or vibration that the input unit is able to accept the first input mode.

11. A control method for a display device including a head-mounted image display unit configured to cause an outside scene to be visually recognized, the control method comprising:
capturing the outside scene;
detecting a movement of a head of a user;
detecting a target object from the outside scene;
setting, as a standard posture, a posture of the head of the user when the target object is detected;
displaying a first image when the head of the user moves from the standard posture to a first direction beyond a first threshold value;
displaying a second image when the head of the user moves from the standard posture to a second direction beyond a second threshold value, the second direction that is different from the first direction;
accepting a first input mode when the head-mounted image display unit displays the first image; and
accepting a second input mode when the head-mounted image display unit displays the second image.

12. A non-transitory computer-readable storage medium storing a computer-executable program for controlling a display device including a head-mounted image display unit configured to cause an outside scene to be visually recognized, the program achieving;
capturing the outside scene;
detecting a movement of a head of a user;
detecting a target object from the outside scene;
setting, as a standard posture, a posture of the head of the user when the target object is detected;
displaying a first image when the head of the user moves from the standard posture to a first direction beyond a first threshold value;
displaying a second image when the head of the user moves from the standard posture to a second direction beyond a second threshold value, the second direction that is different from the first direction;
accepting a first input mode when the display unit displays the first image; and
accepting a second input mode when the display unit displays the second image.

* * * * *